US012679686B2

(12) United States Patent
Yoshizawa et al.

(10) Patent No.: US 12,679,686 B2
(45) Date of Patent: Jul. 14, 2026

(54) MEDIA CONVEYING APPARATUS AND IMAGE FORMING APPARATUS

(71) Applicants: Shingo Yoshizawa, Kanagawa (JP); Yuusuke Shibasaki, Tokyo (JP); Yusuke Hirono, Kanagawa (JP); Atsushi Shinoda, Kanagawa (JP); Shuuto Tohkaishi, Kanagawa (JP); Satoshi Hirata, Kanagawa (JP); Suzuka Fujita, Kanagawa (JP); Naofumi Yoshida, Kanagawa (JP); Ryota Takayama, Kanagawa (JP); Takahiro Watanabe, Kanagawa (JP); Takuya Morinaga, Kanagawa (JP); Yuji Suzuki, Kanagawa (JP); Wataru Nozaki, Kanagawa (JP); Kanako Fujisaki, Kanagawa (JP); Jun Yamada, Kanagawa (JP)

(72) Inventors: Shingo Yoshizawa, Kanagawa (JP); Yuusuke Shibasaki, Tokyo (JP); Yusuke Hirono, Kanagawa (JP); Atsushi Shinoda, Kanagawa (JP); Shuuto Tohkaishi, Kanagawa (JP); Satoshi Hirata, Kanagawa (JP); Suzuka Fujita, Kanagawa (JP); Naofumi Yoshida, Kanagawa (JP); Ryota Takayama, Kanagawa (JP); Takahiro Watanabe, Kanagawa (JP); Takuya Morinaga, Kanagawa (JP); Yuji Suzuki, Kanagawa (JP); Wataru Nozaki, Kanagawa (JP); Kanako Fujisaki, Kanagawa (JP); Jun Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 18/733,060

(22) Filed: Jun. 4, 2024

(65) Prior Publication Data

US 2024/0400331 A1 Dec. 5, 2024

(30) Foreign Application Priority Data

Jun. 5, 2023 (JP) ................................ 2023-092543

(51) Int. Cl.
*B65H 29/14* (2006.01)
*B41J 3/44* (2006.01)
(Continued)

(52) U.S. Cl.
CPC ................ *B65H 29/14* (2013.01); *B41J 3/44* (2013.01); *B41J 13/08* (2013.01); *B65H 29/52* (2013.01);
(Continued)

(58) Field of Classification Search
CPC ........ B65H 29/14; B65H 29/52; B65H 31/10; B65H 43/04; B65H 2402/10;
(Continued)

(56) References Cited

U.S. PATENT DOCUMENTS 6,876,830 B2 * 4/2005 Ohgita .................. G03G 15/70 399/407
2008/0298867 A1 * 12/2008 Watanabe .......... G03G 15/6538 399/407
(Continued)

FOREIGN PATENT DOCUMENTS

JP 2005-173154 A 6/2005
JP 2011-219236 A 11/2011
(Continued)

OTHER PUBLICATIONS

Extended European Search Report for EP24179628.3 mailed on Oct. 30, 2024.

*Primary Examiner* — Timothy R Waggoner
(74) *Attorney, Agent, or Firm* — IPUSA, PLLC

(57) ABSTRACT

A media conveying apparatus includes: a pair of first defining members defining an upstream part of a conveyance path in a conveyance direction; a pair of second defining members defining a downstream part of the conveyance path in the conveyance direction; a first conveyor to convey a medium in the upstream part in the conveyance direction; a second conveyor to convey the medium in the downstream part in the conveyance direction; and a tray disposed downstream from the pair of second defining members in the conveyance direction. The tray stacks the medium ejected from the conveyance path. The pair of first defining members and the pair of second defining members are movable relative to each other in the conveyance direction to lengthen and shorten the conveyance path including the upstream part and the downstream part.

12 Claims, 15 Drawing Sheets

(51) Int. Cl.

| | |
|---|---|
| ***B41J 13/08*** | (2006.01) |
| ***B65H 29/52*** | (2006.01) |
| ***B65H 31/10*** | (2006.01) |
| ***B65H 43/04*** | (2006.01) |
| ***G03G 15/00*** | (2006.01) |

(52) U.S. Cl.

CPC ............ *B65H 31/10* (2013.01); *B65H 43/04* (2013.01); *G03G 15/6529* (2013.01); *G03G 15/6552* (2013.01); *B65H 2402/10* (2013.01); *B65H 2404/1441* (2013.01); *B65H 2511/528* (2013.01); *B65H 2513/52* (2013.01)

(58) Field of Classification Search

CPC ...... B65H 2404/1441; B65H 2511/528; B65H 2513/528; B65H 2513/52; B65H 29/125; B65H 2404/611; B65H 2404/691; B65H 2801/06; B65H 2801/27; B65H 5/36; B41J 3/44; B41J 13/08; G03G 15/6529; G03G 15/6552

See application file for complete search history.

(56) References Cited

U.S. PATENT DOCUMENTS

| | | | | |
|---|---|---|---|---|
| 2010/0072692 | A1* | 3/2010 | Iida .......................... | B65H 5/26 271/145 |
| 2010/0314823 | A1 | 12/2010 | Terao et al. | |
| 2015/0028540 | A1* | 1/2015 | Shibasaki .............. | B65H 37/04 271/306 |
| 2017/0123364 | A1* | 5/2017 | Kobayashi ............. | B65H 29/12 |
| 2018/0359381 | A1 | 12/2018 | Shibazaki | |
| 2019/0300320 | A1* | 10/2019 | Fuchi ....................... | B65H 5/38 |

FOREIGN PATENT DOCUMENTS

| | | | |
|---|---|---|---|
| JP | 2020-138831 | A | 9/2020 |
| JP | 2021-017351 | A | 2/2021 |
| JP | 2021-123490 | A | 8/2021 |
| JP | 2021-134012 | | 9/2021 |
| JP | 2023-006195 | A | 1/2023 |

* cited by examiner

FIG. 14

| OPTIONAL DEVICE | FIRST INSTALLATION SIGNAL | SECOND INSTALLATION SIGNAL | DISTANCE INFORMATION |
|---|---|---|---|
| NO OPTIONAL DEVICE | L | L | 0 |
| HOLE PUNCHING UNIT | H | L | X1 |
| FOLDING UNIT | L | H | X2 |
| HOLE PUNCHING UNIT & FOLDING UNIT | H | H | X1+X2 |

MEDIA CONVEYING APPARATUS AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-092543, filed on Jun. 5, 2023, in the Japan Patent Office, the entire disclosure of which is hereby incorporated by reference herein.

BACKGROUND

Technical Field

The present disclosure relates to a media conveying apparatus and an image forming apparatus.

Related Art

An image forming apparatus includes an image former, a post-processing device, and a tray. The image former forms an image on a sheet. The post-processing device performs post processing on the sheet on which an image has been formed. The sheet subjected to the post processing is to be stacked on the tray. In addition, some of such image forming apparatuses are equipped with a tray that is lifted or lowered to allow a large number of sheets to be stacked on the tray.

As an example of such an image forming apparatus, a configuration has been proposed in which a post-processing device and a liftable tray are unitized and the unit is installed in an in-body space of the image forming apparatus for the purpose of placing a large number of sheets in a space-saving manner.

However, the configuration requires replacement of the entire unit when the post-processing device is to be replaced with another post-processing device that performs a different post processing process (for example, a binding process, a hole punching process, or a folding process) or when an optional device is to be installed in the in-body space.

SUMMARY

The present disclosure provides a media conveying apparatus that includes a pair of first defining members, a pair of second defining members, a first conveyor, a second conveyor, and a tray. The pair of first defining members defines an upstream part of a conveyance path in a conveyance direction. The pair of second defining members defines a downstream part of the conveyance path in the conveyance direction. The first conveyor conveys a medium in the upstream part in the conveyance direction. The second conveyor conveys the medium in the downstream part in the conveyance direction. The tray is disposed downstream from the pair of second defining members in the conveyance direction. The tray stacks the medium ejected from the conveyance path. The pair of first defining members and the pair of second defining members are movable relative to each other in the conveyance direction to lengthen and shorten the conveyance path including the upstream part and the downstream part.

The present disclosure also provides an image forming apparatus that includes an image forming device, a housing, and the media conveying apparatus. The image forming device forms an image on a medium. The housing houses the image forming device and has an in-body space. The media conveying apparatus is detachably installed in the in-body space. The tray moves up and down along an outer wall of the housing.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 14 is an example of data contained in an option table; and

Figure 1C:
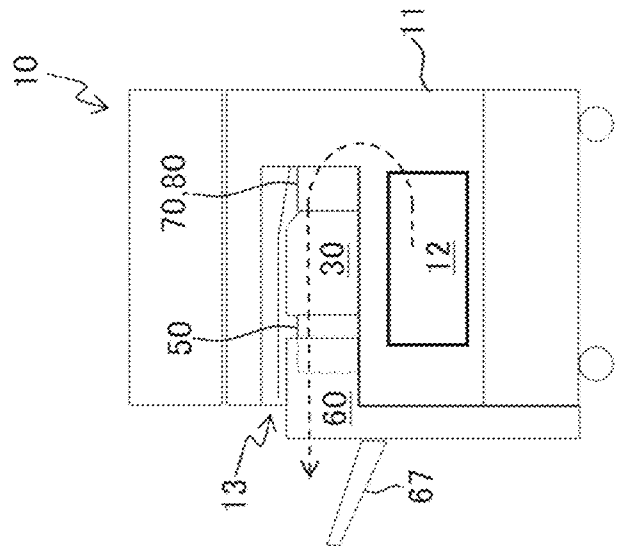
FIGS. 1A to 1C are external views of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 1B:
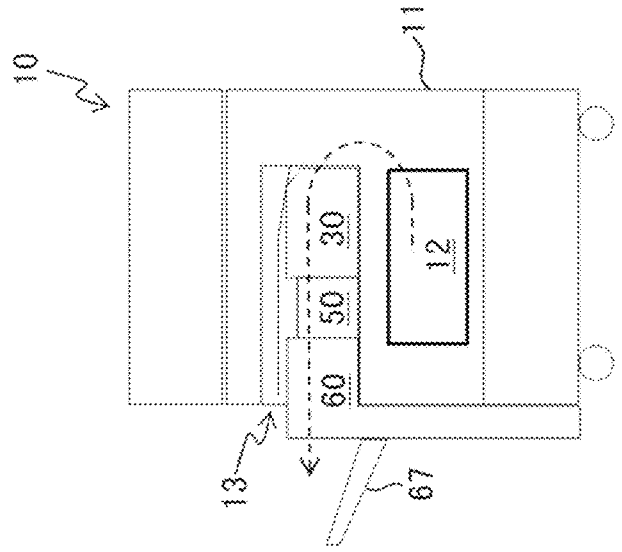
Figure 1A:
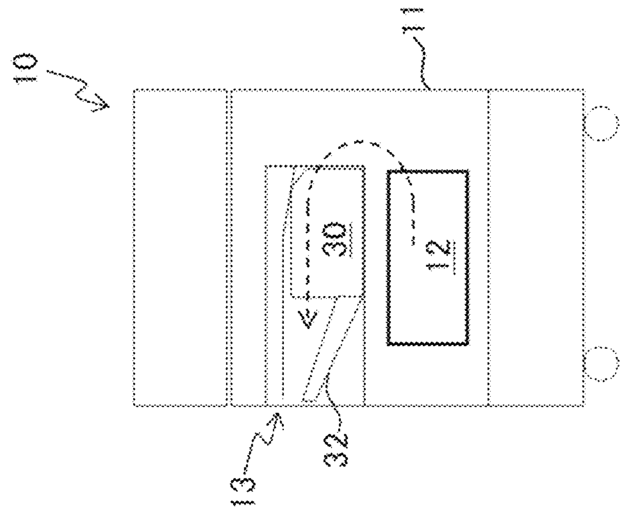

A description is provided of an image forming apparatus 10 according to an embodiment of the present disclosure with reference to the drawings. FIGS. 1A to 1C are external views of the image forming apparatus 10 according to an embodiment of the present disclosure. The image forming apparatus 10 is an apparatus that forms an image on a sheet S which is an example of a sheet medium (typically, a sheet of paper). As illustrated in FIGS. 1A to 1C, the image forming apparatus 10 includes a housing 11 and an image forming device 12.

The housing 11 has a box shape to form an internal space for accommodating components of the image forming apparatus 10. The housing 11 has an in-body space 13 that is accessible from the outside of the image forming apparatus 10. The in-body space 13 is located, for example, slightly above the center of the housing 11 in the vertical direction. An outer wall of the housing 11 has been cut out to expose the in-body space 13 to the outside. Furthermore, the in-body space 13 can accommodate a binding unit 30 (post-processing device), a first conveyance unit 50 and a second conveyance unit 60 (media conveying apparatus), and a hole punching unit 70 and a folding unit 80 (optional devices).

More specifically, FIG. 1A illustrates a state in which only the binding unit 30 has been disposed in the in-body space 13. FIG. 1B illustrates a state in which the first conveyance unit 50 and the second conveyance unit 60 have been disposed in the in-body space 13, together with the binding unit 30. FIG. 1C illustrates a state in which both the hole punching unit 70 and the folding unit 80 have been disposed in the in-body space 13, together with the binding unit 30, the first conveyance unit 50, and the second conveyance unit 60. Alternatively, one of the hole punching unit 70 and the folding unit 80 may be disposed in the in-body space 13, together with the binding unit 30, the first conveyance unit 50, and the second conveyance unit 60.

The image forming device 12 forms an image on the sheet S stored in a tray, and ejects the sheet S on which the image has been formed to the binding unit 30, the hole punching unit 70, or the folding unit 80. The image forming device 12 may be an inkjet image forming device that forms an image with ink, or may be an electrophotographic image forming device that forms an image with toner. Since the image forming device 12 has a known configuration, a detailed description of the configuration of the image forming device 12 is omitted.

The hole punching unit 70 and the folding unit 80 are installed in the in-body space 13 of the image forming apparatus 10 such that the hole punching unit 70 and the folding unit 80 are located downstream from the image forming device 12 and upstream from the binding unit 30 on a conveyance path (a path indicated by a dashed arrow in each of FIGS. 1A to 1C) of the sheet S from the image forming device 12 to the binding unit 30. That is, the sheet S on which an image has been formed by the image forming device 12 is subjected to one or both of a hole punching process (described below) by the hole punching unit 70 and a folding process (described below) by the folding unit 80, and is then delivered to the binding unit 30 and subjected to a binding process to be described below.

The hole punching unit 70 and the folding unit 80 are detachably installed in the image forming apparatus 10. When the hole punching unit 70 and the folding unit 80 are removed, the sheet S on which an image has been formed by the image forming device 12 is directly delivered to the binding unit 30 and subjected to the binding process. Furthermore, another optional device such as a liquid applying unit is detachably installed at a location in the in-body space 13 where the hole punching unit 70 and the folding unit 80 were disposed before being removed.

When the liquid applying unit is installed, the sheet S on which the image has been formed by the image forming device 12 is first delivered to the liquid applying unit and subjected to a liquid applying process, and is then delivered to the binding unit 30 and subjected to the binding process. The liquid applying process refers to a process of applying liquid to a binding position on the surface of the sheet S at which the sheet S is to be bound by the binding unit 30. Note that any optional device other than the liquid applying unit may be installed at the location in the in-body space 13 where the hole punching unit 70 and the folding unit 80 were disposed before being removed, so as to perform a desired process on the sheet S. Optional devices may be omitted.

Furthermore, each of the binding unit 30, the first conveyance unit 50, the second conveyance unit 60, the hole punching unit 70, the folding unit 80, and the liquid applying unit is unitized, to which an input-output interface of the sheet S can be connected. That is, in the image forming apparatus 10, the binding unit 30, the hole punching unit 70, the folding unit 80, and the liquid applying unit are replaceable according to the intended use of the image forming apparatus 10.

More specifically, input interfaces of the binding unit 30, the hole punching unit 70, the folding unit 80, and the liquid applying unit can be connected to an output interface of the image forming device 12. The input interface of the binding unit 30 can also be connected to the hole punching unit 70, the folding unit 80, and the liquid applying unit. An output interface of the binding unit 30 can be connected to an input interface of the first conveyance unit 50. Furthermore, an input interface of the second conveyance unit 60 can be connected to an output interface of the first conveyance unit 50. Adjacent units are detachably connected to each other by a mechanical lock, a magnet, or the like. The units installed in the in-body space 13 are each connected to a controller 100 (see FIG. 13) by a harness for transmitting and receiving various signals.

Figure 2A:
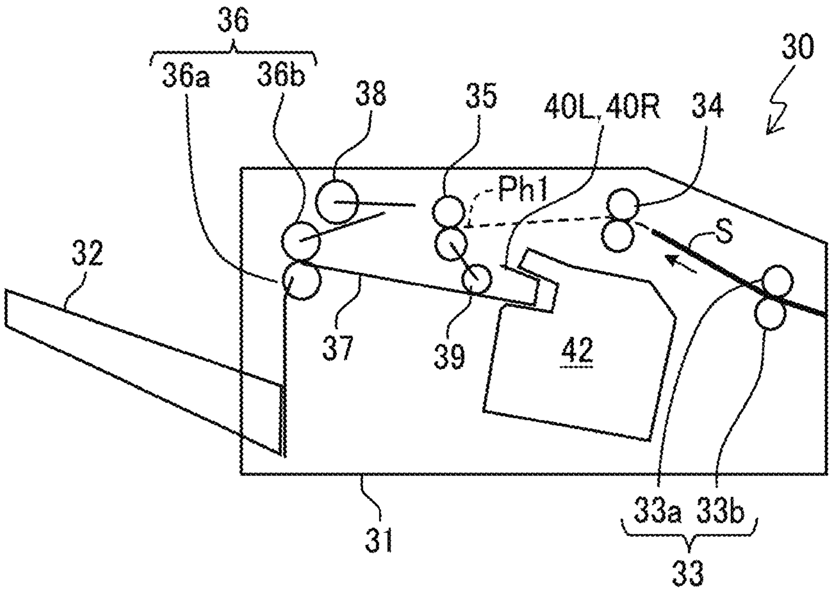
FIG. 2A is a side view of a binding unit, which illustrates an internal configuration thereof.
Figure 2B:
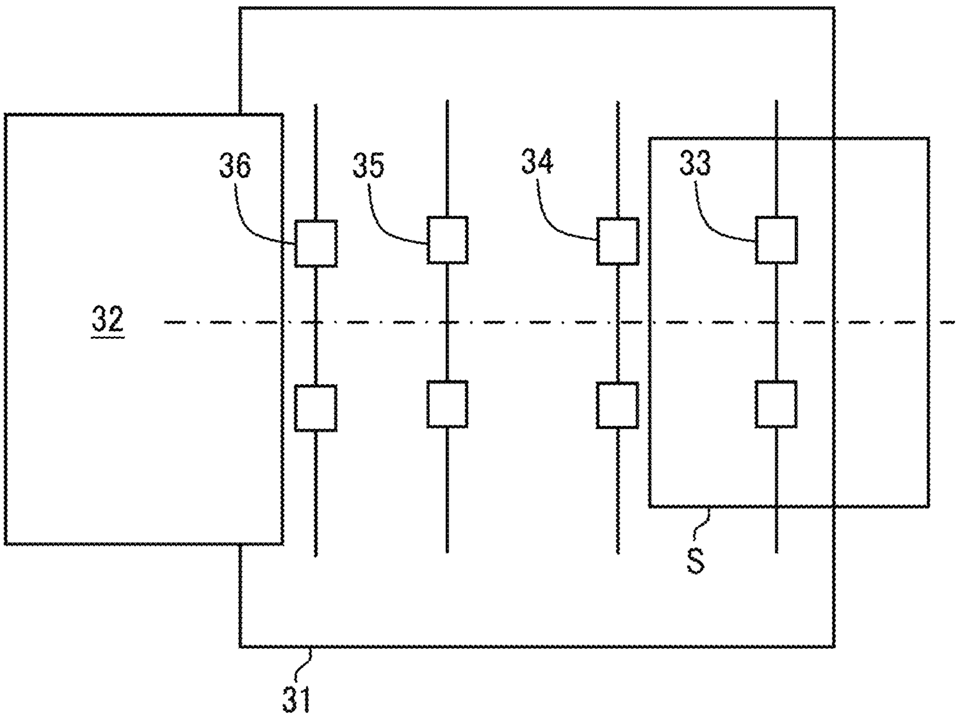
FIG. 2B is a plan view of the binding unit, which illustrates the internal configuration thereof.
Figure 3A:
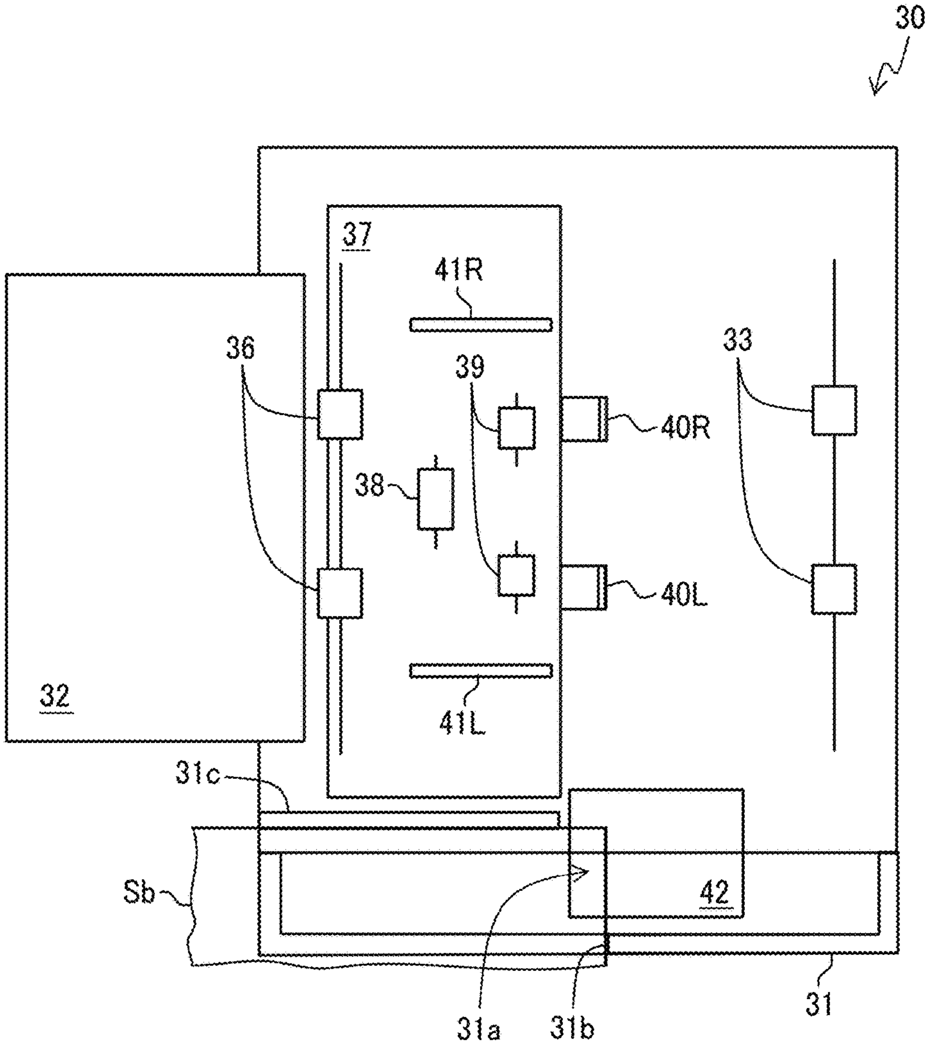
FIG. 3A is a plan view of the binding unit, which illustrates a position of a binder.
Figure 3B:
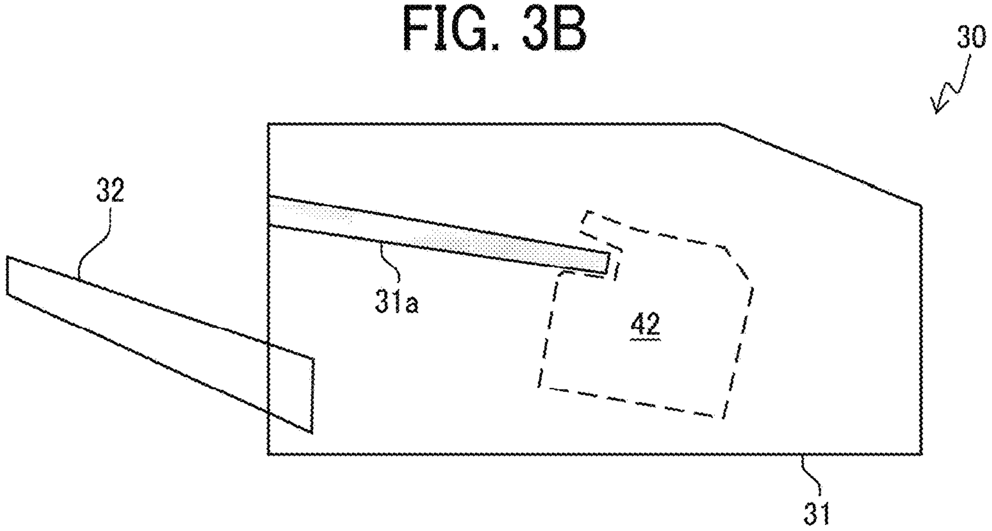
FIG. 3B is a side view of the binding unit, which illustrates a slit.

FIG. 2A is a side view of the binding unit 30, which illustrates an internal configuration thereof. FIG. 2B is a plan view of the binding unit 30, which illustrates the internal configuration thereof. FIG. 3A is a plan view of the binding unit 30, which illustrates a position of a binder 42. FIG. 3B is a side view of the binding unit 30, which illustrates a slit 31*a*. The binding unit 30 performs the binding process (post processing) of binding a plurality of sheets S (sheet bundle Sb) on which images have been formed by the image forming device 12. However, a specific example of the post-processing device is not limited to the binding unit 30. As illustrated in FIGS. 2A, 2B, 3A, and 3B, the binding unit 30 includes a binding case 31, an output tray 32, a plurality of conveyance roller pairs 33, 34, 35, and 36, an internal tray 37, a tapping roller 38, return rollers 39, end fences 40L and 40R, side fences 41L and 41R, and the binder 42.

The binding case 31 has a box shape to form an internal space for accommodating the components (33 to 42) of the binding unit 30. A conveyance path Ph1 is formed in the internal space of the binding case 31. The conveyance path Ph1 is a space through which the sheet S passes. The output tray 32 is supported on an outer surface of the binding case 31. The sheet S or the sheet bundle Sb conveyed by the conveyance roller pairs 33 to 36 is stacked on the output tray 32.

The conveyance roller pairs 33 to 36 are arranged on the conveyance path Ph1 at predetermined intervals. The conveyance roller pairs 33 to 36 convey the sheet S along the conveyance path Ph1. The conveyance roller pair 33 includes a driving roller 33*a* and a driven roller 33*b* disposed in such a way as to face each other across the conveyance path Ph1. The driving roller 33*a* and the driven roller 33*b* are rotatably supported by the binding case 31. The rotary drive force of a conveyance motor is transmitted to the driving roller 33*a* to rotate the driving roller 33*a* forward in a direction of conveying the sheet S (clockwise direction in FIGS. 2A and 2B). The driven roller 33*b* is disposed in such a way as to face the driving roller 33*a* across the conveyance path Ph1, and is driven by rotation of the driving roller 33*a*. Driving the conveyance motor causes the sheet S nipped by the driving roller 33*a* and the driven roller 33*b* to be conveyed along the conveyance path Ph1.

The conveyance roller pairs 34 to 36 each have a basic configuration in common with the conveyance roller pair 33. However, the conveyance roller pair 36 includes a driving roller 36*a* and a driven roller 36*b* that can be brought into contact with and separated from the driving roller 36*a*. The conveyance roller pair 35 may be slidable in the width direction so as to implement a sorting process in which the sheets S are shifted in the width direction and ejected to the output tray 32.

The internal tray 37 temporarily supports the plurality of sheets S conveyed by the conveyance roller pair 36. The tapping roller 38 is supported at an end of a rotation arm above the internal tray 37. As the rotation arm is rotated, the tapping roller 38 supplies the sheet S nipped by the conveyance roller pair 36 to the internal tray 37. The return rollers 39 rotate in contact with the upper surface of the sheet S supported by the internal tray 37 to guide the sheet S toward the conveyance roller pair 36. Hereinafter, a direction from the conveyance roller pair 36 toward the end fences 40L and 40R is referred to as a "first conveyance direction", and a direction orthogonal to the first conveyance direction and the thickness direction of the sheet S supported by the internal tray 37 is referred to as a "main scanning direction".

The end fences 40L and 40R are in contact with downstream ends of the sheets S supported by the internal tray 37 in the first conveyance direction, and align positions of the sheets S in the first conveyance direction. The side fences 41L and 41R are in contact with both width-direction ends of the sheets S supported by the internal tray 37 to align positions of the sheets S in the main scanning direction.

The binder 42 is disposed at a downstream end of the sheet bundle Sb supported by the internal tray 37 in the first conveyance direction. The binder 42 is movable along the sheet bundle Sb supported by the internal tray 37 in the main scanning direction orthogonal to the first conveyance direction. As an example, the binder 42 is a press-bonding binder that presses and deforms the sheet bundle Sb to bind the sheet bundle Sb. As another example, the binder 42 is a needle binder that causes a binding needle to penetrate the sheet bundle Sb and binds the sheet bundle Sb. As still another example, the binding unit 30 may include both the press-bonding binder and the needle binder.

As illustrated in FIGS. 3A and 3B, the slit 31*a* for manual binding is provided at a position facing the binder 42 of the binding case 31. A corner of the sheet bundle Sb inserted into the binding case 31 through the slit 31*a* can be manually bound by the binder 42. The binding case 31 further includes guide walls 31*b* and 31*c* in such a way as to surround the slit 31*a*. The guide wall 31*b* performs the positioning of the sheet bundle Sb to be manually bound (that is, the sheet bundle Sb having a corner to be inserted into the slit 31*a*) in the first conveyance direction. The guide wall 31*c* performs the positioning of the sheet bundle Sb to be manually bound (that is, the sheet bundle Sb having a corner to be inserted into the slit 31*a*) in the main scanning direction.

Figure 4A:
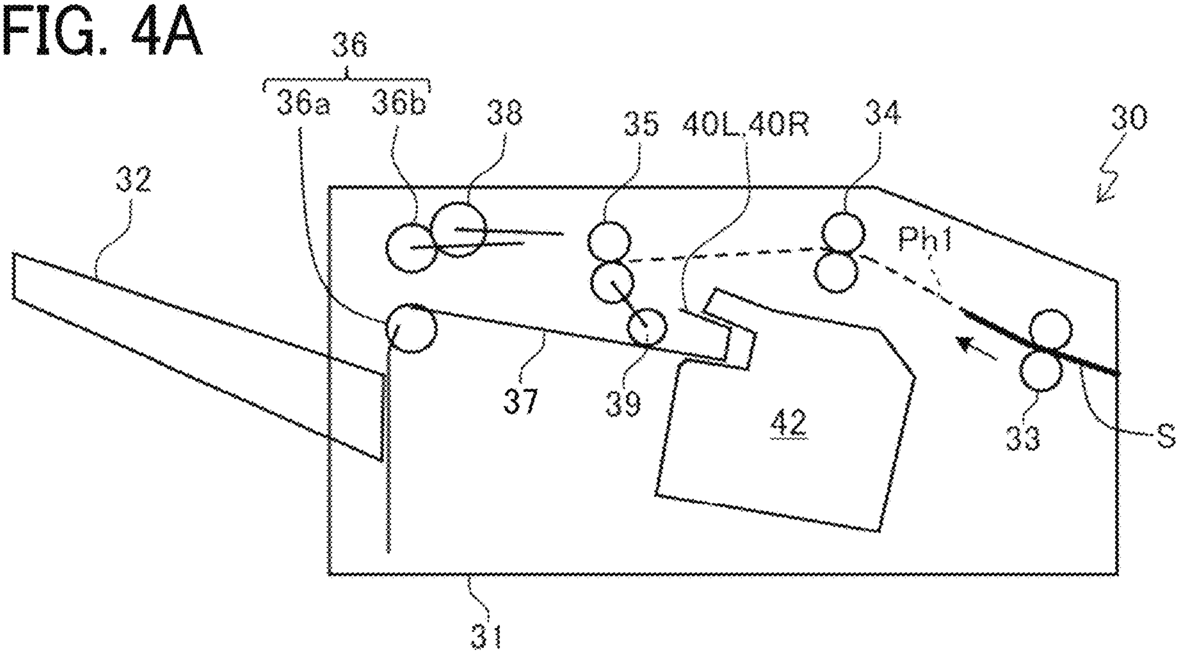
FIG. 4A is a diagram illustrating the binding unit in which a sheet has not yet reached a conveyance roller pair.
Figure 4B:
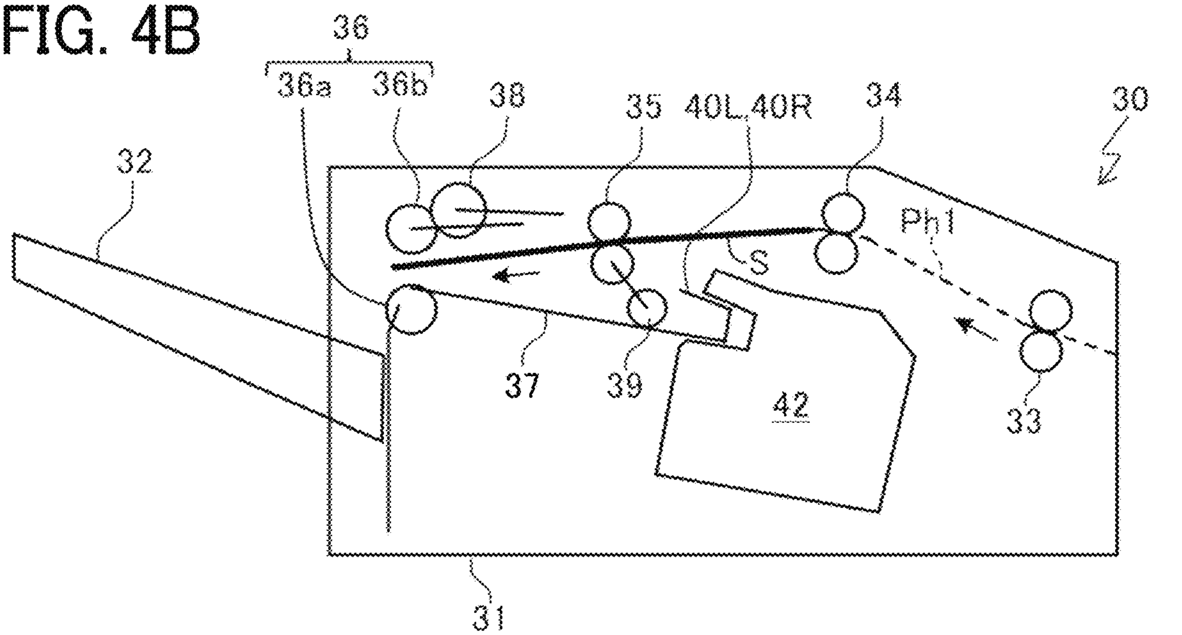
FIG. 4B is a diagram illustrating the binding unit in which the sheet has reached the conveyance roller pair.
Figure 5A:
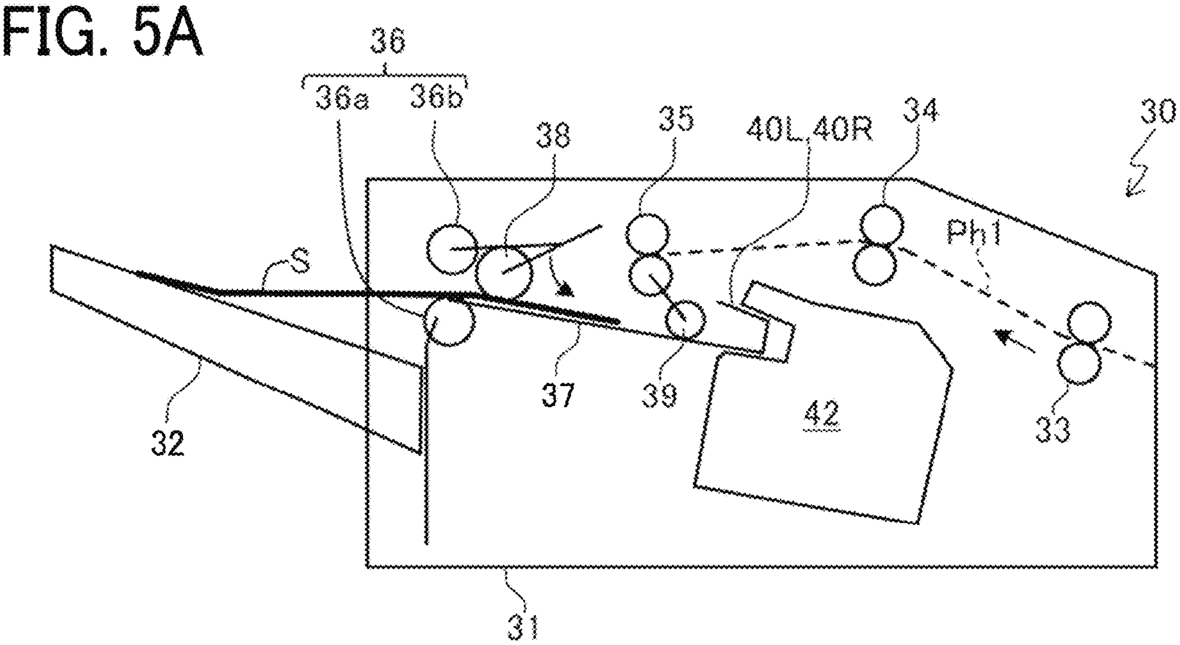
FIGS. 5A and 5B are diagrams each illustrating a state of the binding unit performing a binding process.
Figure 5B:
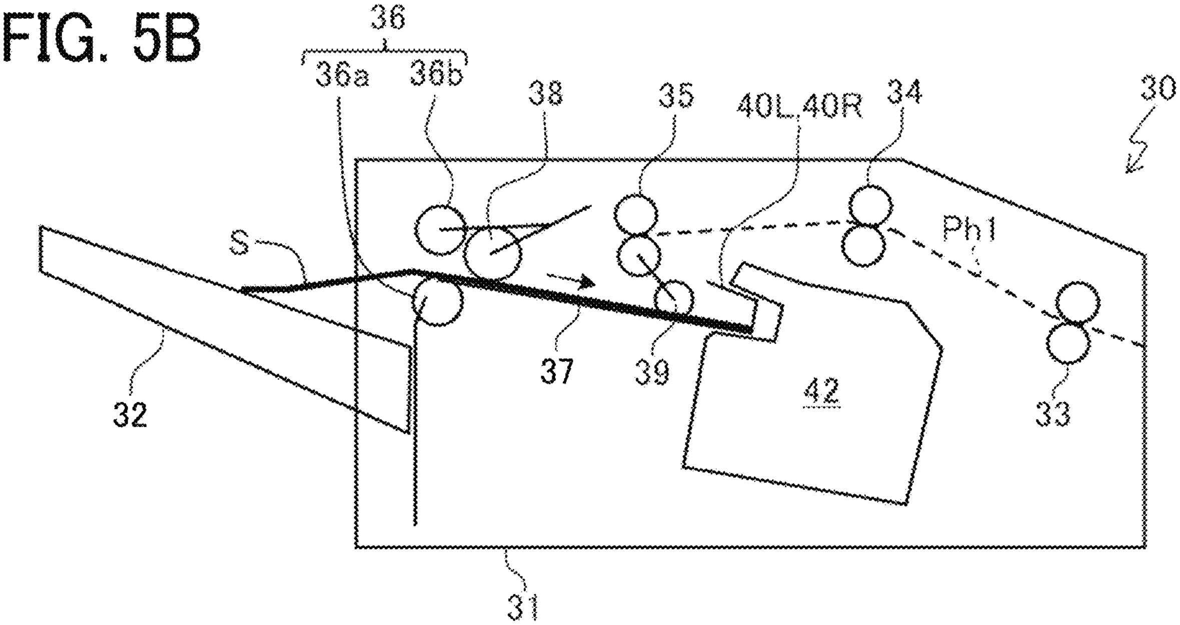
Figure 6:
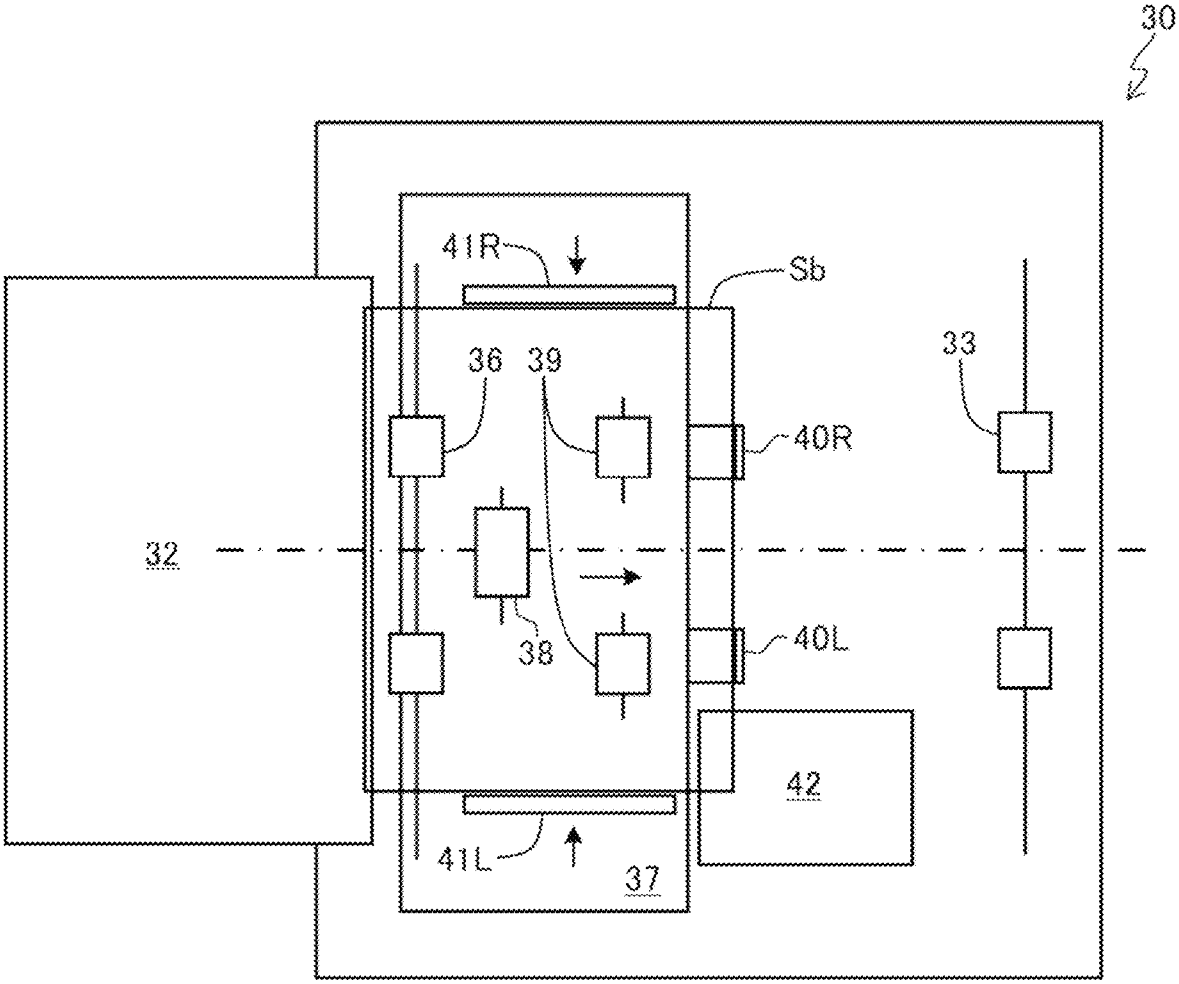
FIG. 6 is a diagram illustrating the binding unit in the state illustrated in FIG. 5B as viewed from a sheet thickness direction.
Figure 7A:
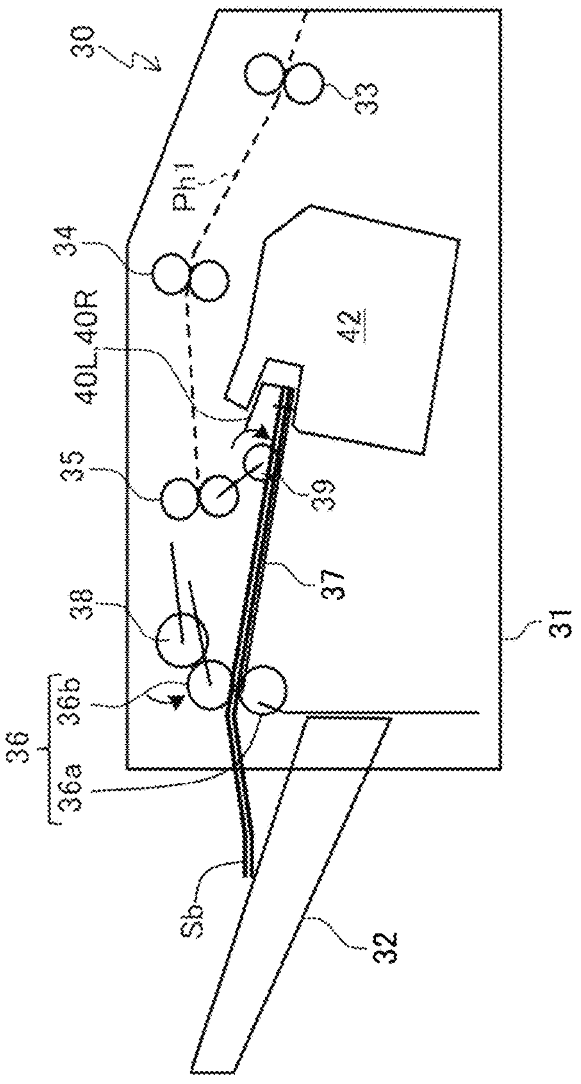
FIGS. 7A and 7B are diagrams illustrating the binding unit in a state where a sheet bundle subjected to the binding process is ejected to an output tray.
Figure 7B:
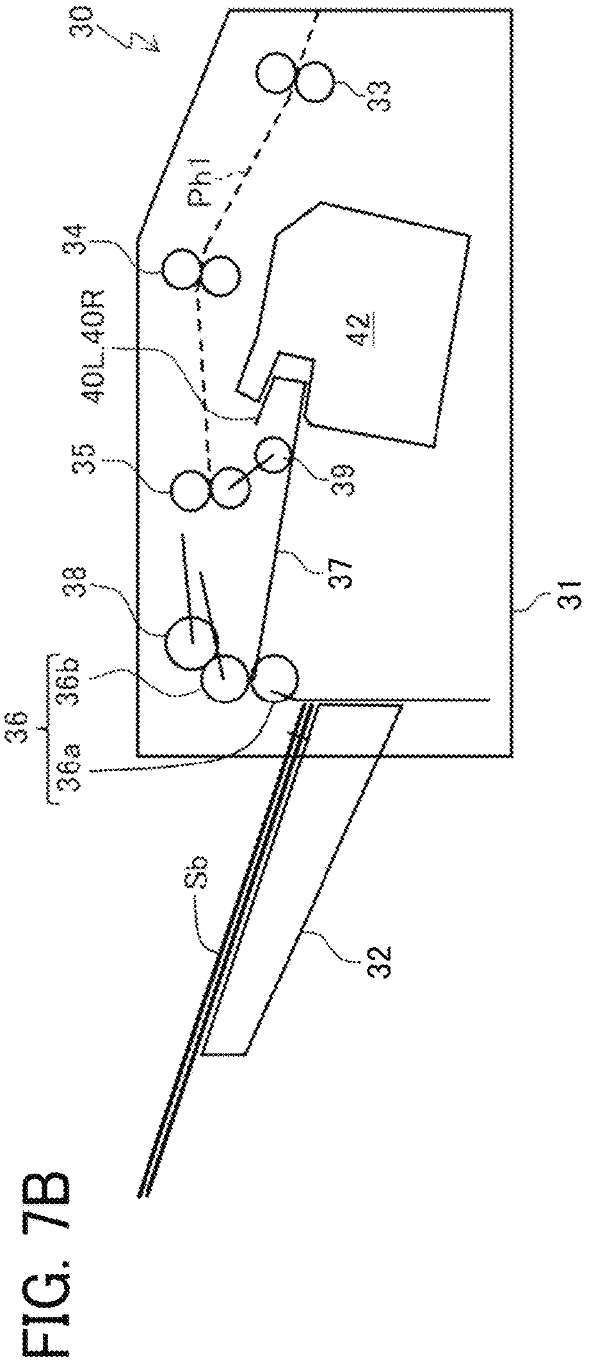

Next, the binding process will be described with reference to FIGS. 4A to 7B. FIG. 4A is a diagram illustrating the binding unit 30 in which the sheet S has not yet reached the conveyance roller pair 36, and FIG. 4B is a diagram illustrating the binding unit 30 in which the sheet S has reached the conveyance roller pair 36. FIGS. 5A and 5B are diagrams each illustrating a state of the binding unit 30 performing the binding process. FIG. 6 is a diagram illustrating the binding unit 30 in the state illustrated in FIG. 5B as viewed from the thickness direction of the sheet S. FIGS. 7A and 7B are diagrams illustrating the binding unit 30 in a state where the sheet bundle Sb subjected to the binding process is ejected to the output tray 32.

As illustrated in FIGS. 4A and 4B, the binding unit 30 rotates the conveyance roller pairs 33 to 35 in the forward direction to convey the sheet S supplied from the image forming device 12 along the conveyance path Ph1. At this time, the driving roller 36*a* and the driven roller 36*b* of the conveyance roller pair 36 are separated from each other.

Next, as illustrated in FIGS. 5A and 5B, the binding unit 30 brings the tapping rollers 38 into contact with the sheet S having passed through the conveyance roller pair 35, and rotates the tapping rollers 38 to store the sheet S in the internal tray 37. In the binding unit 30, the side fences 41L and 41R are moved in the width direction as illustrated in FIG. 6 to align, in the width direction, positions of the sheets S stored in the internal tray 37.

Thus, the binding unit 30 forms the sheet bundle Sb on the internal tray 37 by repeating the process illustrated in FIGS. 4A to 6. Next, the binding unit 30 causes the binder 42 to face a binding position of the sheet bundle Sb in response to a predetermined number of sheets S being stacked on the internal tray 37. Then, the binding unit 30 drives the binder 42 to bind the sheet bundle Sb supported by the internal tray 37.

Next, as illustrated in FIG. 7A, the binding unit 30 brings the return rollers 39 into contact with the press-bonded sheet bundle Sb, and rotates the return rollers 39 to cause the sheet bundle Sb to be nipped by the driving roller 36*a* and the driven roller 36*b*. Then, as illustrated in FIG. 7B, the binding unit 30 rotates the conveyance roller pair 36 in the forward direction to eject the sheet bundle Sb to the output tray 32.

Figure 8A:
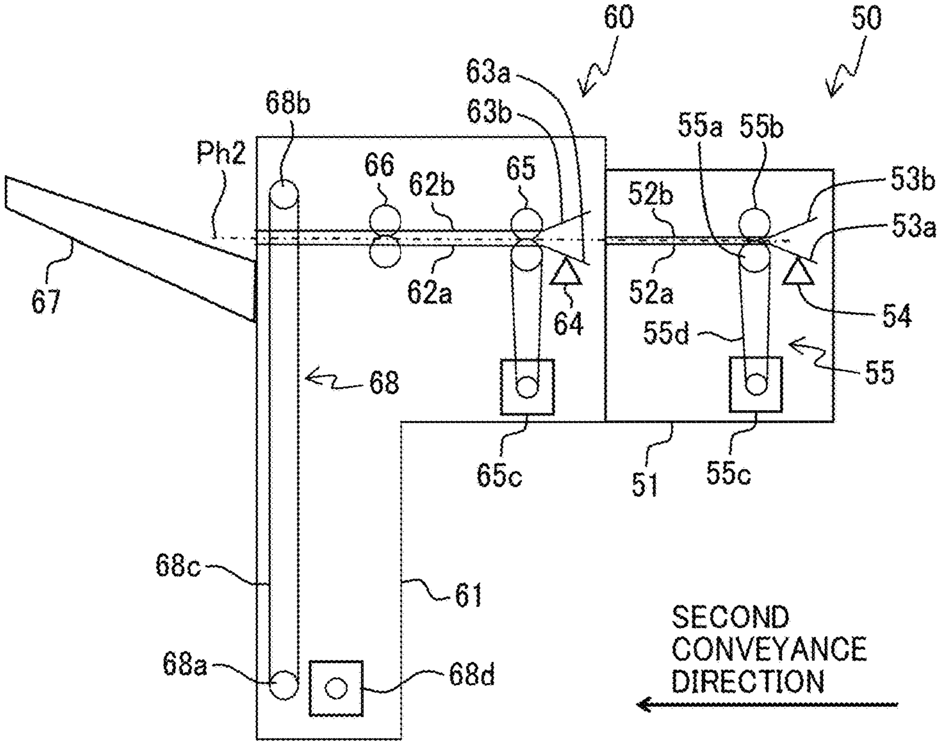
FIG. 8A is a side view of a media conveying apparatus in a state where the distance between a first conveyor and a second conveyor has been increased.
Figure 8B:
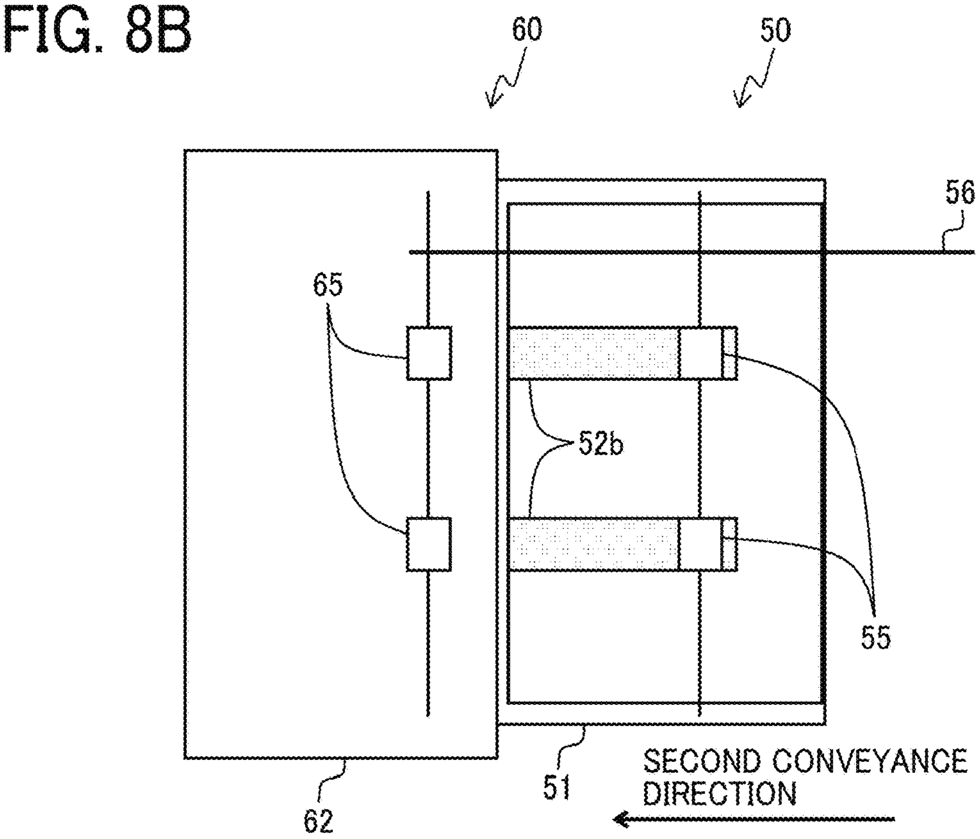
FIG. 8B is a plan view of a main part of the media conveying apparatus in the same state.
Figure 9A:
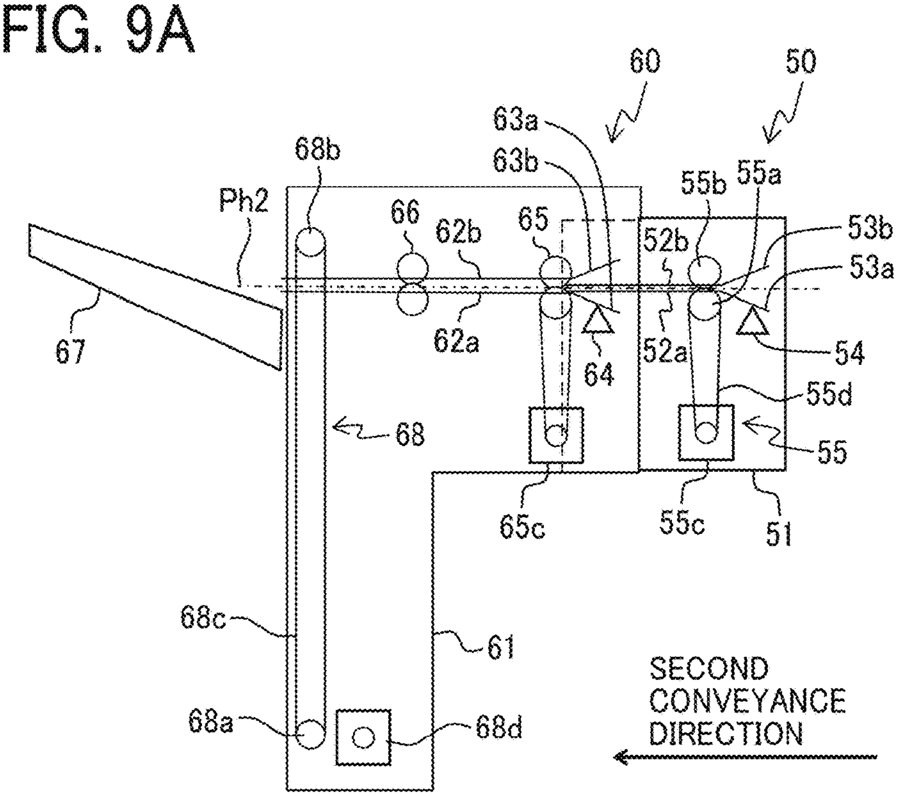
FIG. 9A is a side view of the media conveying apparatus in a state where the distance between the first conveyor and the second conveyor has been reduced.
Figure 9B:
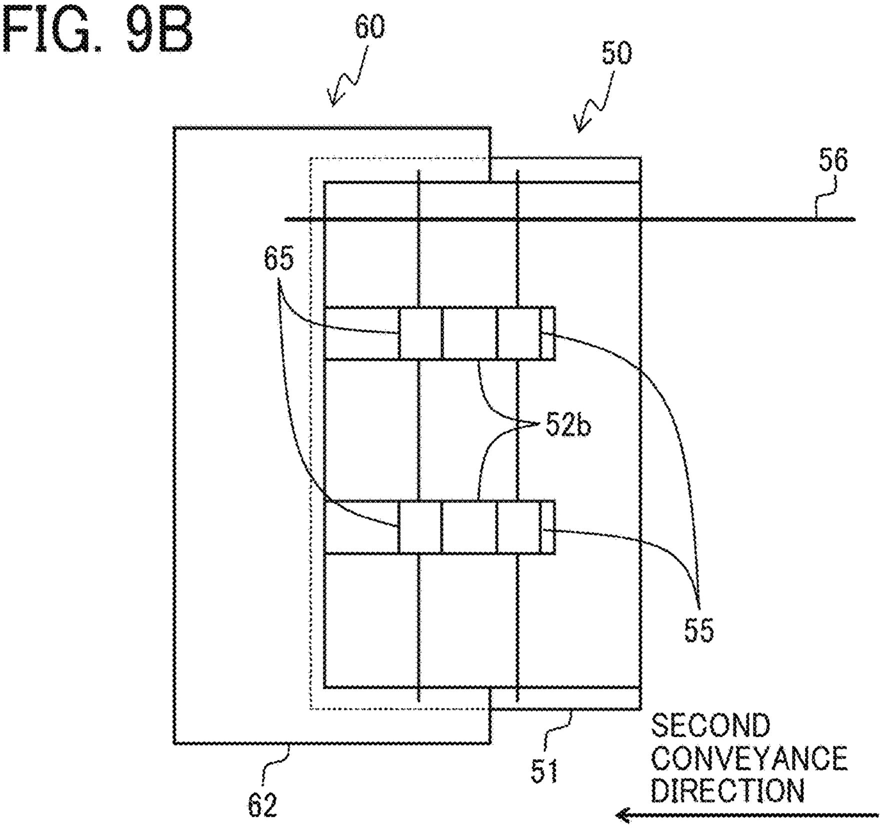
FIG. 9B is a plan view of the main part of the media conveying apparatus in the same state.

Next, a configuration of the media conveying apparatus will be described with reference to FIGS. 8A to 11B. FIG. 8A is a side view of the media conveying apparatus in a state where the distance between a first conveyor 55 and a second conveyor 65 has been increased. FIG. 8B is a plan view of a main part of the media conveying apparatus in the same state. FIG. 9A is a side view of the media conveying apparatus in a state where the distance between the first conveyor 55 and the second conveyor 65 has been reduced. FIG. 9B is a plan view of the main part of the media conveying apparatus in the same state.

As illustrated in FIGS. 8A, 8B, 9A, and 9B, the media conveying apparatus according to the present embodiment includes the first conveyance unit 50 and the second conveyance unit 60. Therefore, in the present specification, the media conveying apparatus is referred to as a "media conveying apparatus (50, 60)". The first conveyance unit 50 is disposed upstream from the second conveyance unit 60 in the second conveyance direction. Hereinafter, a direction from the first conveyance unit 50 toward the second conveyance unit 60 along a conveyance path Ph2 formed inside the media conveying apparatus (50, 60) is referred to as a "second conveyance direction".

The media conveying apparatus (50, 60) can be detachably installed in the in-body space. The input interface of the media conveying apparatus (50, 60) can be connected to the output interface of the binding unit 30. More specifically, the media conveying apparatus (50, 60) is connected to the output interface of the binding unit 30 from which the output tray 32 has been removed. The media conveying apparatus (50, 60) has a function of putting a large number of sheets S or sheet bundles Sb ejected from the binding unit 30 on an output tray 67.

The first conveyance unit 50 mainly includes a first housing 51, a pair of first defining members 52*a* and 52*b*, a pair of first guides 53*a* and 53*b*, a sheet sensor 54, and the first conveyor 55. The first housing 51 has a box shape to form an internal space for accommodating the components (52 to 55) of the first conveyance unit 50.

The pair of first defining members 52*a* and 52*b* is disposed at a predetermined distance in the vertical direction inside the first housing 51. An upstream part of the conveyance path Ph2 in the second conveyance direction is formed between the pair of first defining members 52*a* and 52*b*. That is, the pair of first defining members 52*a* and 52*b* defines the upstream part of the conveyance path Ph2 in the second conveyance direction.

The pair of first guides 53*a* and 53*b* is disposed at an upstream end of the pair of first defining members 52*a* and 52*b* in the second conveyance direction. The pair of first guides 53*a* and 53*b* is disposed such that the distance between the first guides 53*a* and 53*b* increases toward the upstream side in the second conveyance direction. The pair of first guides 53*a* and 53*b* plays a role of guiding the sheet S or the sheet bundle Sb ejected from the binding unit 30 to a space between the pair of first defining members 52*a* and 52*b*.

The sheet sensor 54 is installed at an upstream end of the conveyance path Ph2 defined by the pair of first defining members 52*a* and 52*b* in the second conveyance direction (typically, at the position of the pair of first guides 53*a* and 53*b*). The sheet sensor 54 outputs a detection signal to the controller 100 when the sheet S is located at an installation position (that is, located between the pair of first guides 53*a* and 53*b*), and stops outputting the detection signal when the sheet S is not located at the installation position. For example, a reflective or transmissive optical sensor may be employed as the sheet sensor 54.

Figure 10A:
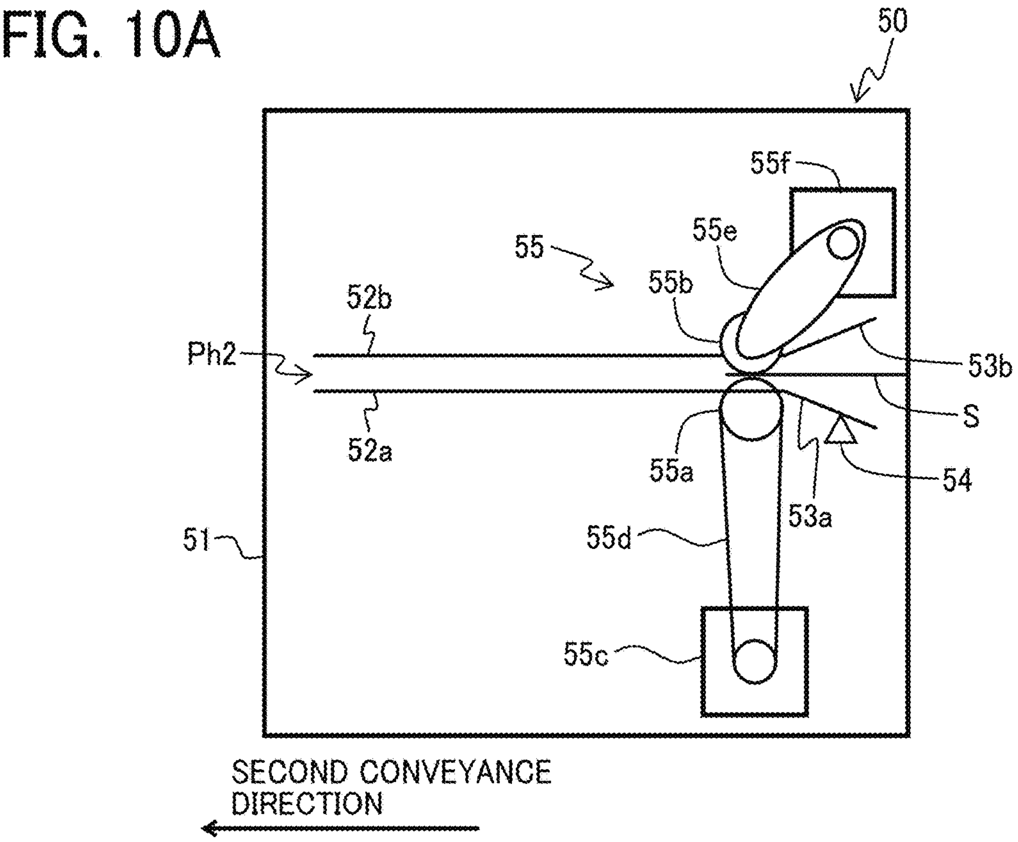
FIGS. 10A and 10B are schematic diagrams illustrating a configuration of the first conveyor.
Figure 10B:
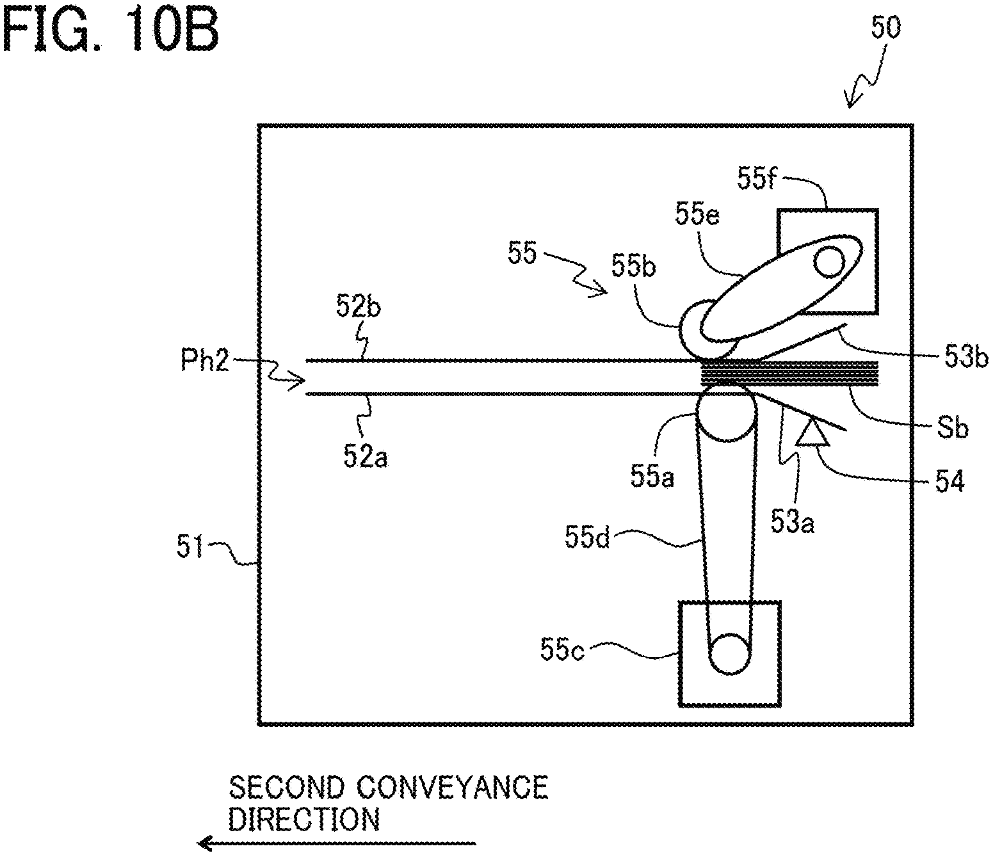

FIGS. 10A and 10B are schematic diagrams illustrating a configuration of the first conveyor 55. As illustrated in FIGS. 10A and 10B, the first conveyor 55 is disposed downstream from the sheet sensor 54 in the second conveyance direction. The first conveyor 55 conveys the sheet S or the sheet bundle Sb in the second conveyance direction in the conveyance path Ph2 defined by the pair of first defining members 52*a* and 52*b*. The first conveyor 55 includes, for example, a driving roller 55*a*, a driven roller 55*b*, a drive motor 55*c*, a driving force transmission mechanism 55*d*, an arm 55*e*, and a pressing mechanism 55*f*.

The driving roller 55*a* is disposed on one side of the conveyance path Ph2 in the thickness direction (on the same side as the first defining member 52*a* in the present embodiment). The driven roller 55*b* is disposed on the other side of the conveyance path Ph2 in the thickness direction (on the same side as the first defining member 52*b* in the present embodiment). That is, the driving roller 55*a* and the driven roller 55*b* are disposed in such a way as to face each other across the conveyance path Ph2. The driving roller 55*a* and the driven roller 55*b* nip the sheet S or the sheet bundle Sb in the conveyance path Ph2 defined by the pair of first defining members 52*a* and 52*b*, and rotate.

The drive motor 55*c* generates driving force for rotating the driving roller 55*a*. The driving force of the drive motor 55*c* is transmitted to the driving roller 55*a* via the driving force transmission mechanism 55*d*. The driving force transmission mechanism 55*d* includes a gear, a pulley, a timing belt, or a combination thereof. As a result, the driving roller 55*a* rotates in a direction (counterclockwise direction in FIGS. 10A and 10B) in which the sheet S or the sheet bundle Sb in the conveyance path Ph2 is conveyed in the second conveyance direction. The driven roller 55*b* is driven by rotation of the driving roller 55*a*. The driving roller 55*a* and the driven roller 55*b* nip the sheet S or the sheet bundle Sb in the conveyance path Ph2, and rotate to convey the sheet S or the sheet bundle Sb in the second conveyance direction.

The arm 55*e* rotatably supports the driven roller 55*b*. The arm 55*e* rotates in a direction in which the driven roller 55*b* comes into contact with the driving roller 55*a* and in a direction in which the driven roller 55*b* separates from the driving roller 55*a*. The pressing mechanism 55*f* presses the driven roller 55*b* against the driving roller 55*a*. The magnitude of pressing force to be generated by the pressing mechanism 55*f* is set such that the driven roller 55*b* can be brought into contact with and separated from the driving roller 55*a* according to the thickness of the sheet S or the sheet bundle Sb entering a space between the driving roller 55*a* and the driven roller 55*b*, and that the driving roller 55*a* and the driven roller 55*b* can nip and convey the sheet S or the sheet bundle Sb. As a result, the distance between the driving roller 55*a* and the driven roller 55*b* is adjusted according to the thickness of the sheet S or the sheet bundle Sb in the conveyance path Ph2. That is, the first conveyor 55 can convey the sheets S or the sheet bundles Sb having different thicknesses.

The second conveyance unit 60 mainly includes a second housing 61, a pair of second defining members 62*a* and 62*b*, a pair of second guides 63*a* and 63*b*, a sheet sensor 64, the second conveyor 65, a second conveyor 66, the output tray 67, and a lift 68. The second housing 61 has a box shape to form an internal space for accommodating the components (62 to 66, 68) of the second conveyance unit 60. In addition, the second housing 61 supports the output tray 67 with an outer wall in such a way as to allow the output tray 67 to be raised and lowered. More specifically, when the second conveyance unit 60 is installed in the in-body space 13, a portion of the second housing 61 that supports the output tray 67 is disposed along an outer surface of the housing 11 outside the in-body space 13 as illustrated in FIGS. 1B and 1C.

The pair of second defining members 62*a* and 62*b* is disposed at a predetermined distance in the vertical direction inside the second housing 61. A downstream part of the conveyance path Ph2 in the second conveyance direction is formed between the pair of second defining members 62*a* and 62*b*. That is, the pair of second defining members 62*a* and 62*b* defines the downstream part of the conveyance path Ph2 in the second conveyance direction. The distance between the pair of second defining members 62*a* and 62*b* is larger than the distance between the pair of first defining members 52*a* and 52*b*.

The pair of first defining members 52*a* and 52*b* and the pair of second defining members 62*a* and 62*b* do not need to fully cover the entire conveyance path Ph2, but just need to partially cover the conveyance path Ph2 to such an extent that the sheet S or the sheet bundle Sb conveyed in the second conveyance direction can be supported.

The pair of second guides 63*a* and 63*b* is disposed at an upstream end of the pair of second defining members 62*a* and 62*b* in the second conveyance direction. The pair of second guides 63*a* and 63*b* is disposed such that the distance between the second guides 63*a* and 63*b* increases toward the upstream side in the second conveyance direction. The pair of second guides 63*a* and 63*b* plays a role of guiding the sheet S or the sheet bundle Sb ejected from the first conveyance unit 50 to a space between the pair of second defining members 62*a* and 62*b*.

The sheet sensor 64 is installed at an upstream end of the conveyance path Ph2 defined by the pair of second defining members 62*a* and 62*b* in the second conveyance direction (typically, at the position of the pair of second guides 63*a* and 63*b*). The sheet sensor 64 outputs a detection signal to the controller 100 when the sheet S is located at an installation position (that is, located between the pair of second guides 63*a* and 63*b*), and stops outputting the detection signal when the sheet S is not located at the installation position. For example, a reflective or transmissive optical sensor may be employed as the sheet sensor 64.

The second conveyors 65 and 66 are disposed downstream from the sheet sensor 64 in the second conveyance direction. The second conveyors 65 and 66 are disposed away from each other in the second conveyance direction. Furthermore, the second conveyors 65 and 66 are driven (rotated) in conjunction with each other by a common drive motor 65*c*. The second conveyors 65 and 66 convey the sheet S or the sheet bundle Sb in the second conveyance direction in the conveyance path Ph2 defined by the pair of second defining members 62*a* and 62*b*. The configurations of the second conveyors 65 and 66 may be similar to the configuration of the first conveyor 55 illustrated in FIGS. 10A and 10B, for example.

The output tray 67 is supported on an outer surface of the second housing 61 on the downstream side of the pair of second defining members 62*a* and 62*b* in the second conveyance direction. Furthermore, the output tray 67 is disposed below a downstream end (outlet) of the conveyance path Ph2 in the second conveyance direction. The output tray 67 can be raised and lowered along the outer surface of the second housing 61. The sheet S or the sheet bundle Sb ejected from the conveyance path Ph2 by the second conveyors 65 and 66 is stacked on the output tray 67.

The lift 68 raises and lowers the output tray 67. The lift 68 includes, for example, pulleys 68*a* and 68*b*, a timing belt 68*c* that is an endless annular belt, and a lifting motor 68*d*. The pulleys 68*a* and 68*b* are located away from each other in the vertical direction, and are each rotatably supported by the second housing 61. The timing belt 68*c* is stretched around the pulleys 68*a* and 68*b*. The lifting motor 68*d* generates driving force for rotating the pulley 68*a* (raising and lowering the output tray 67). As a result, the output tray 67 moves up and down which is coupled to the timing belt 68*c* circulating around the pulleys 68*a* and 68*b*.

Figure 11A:
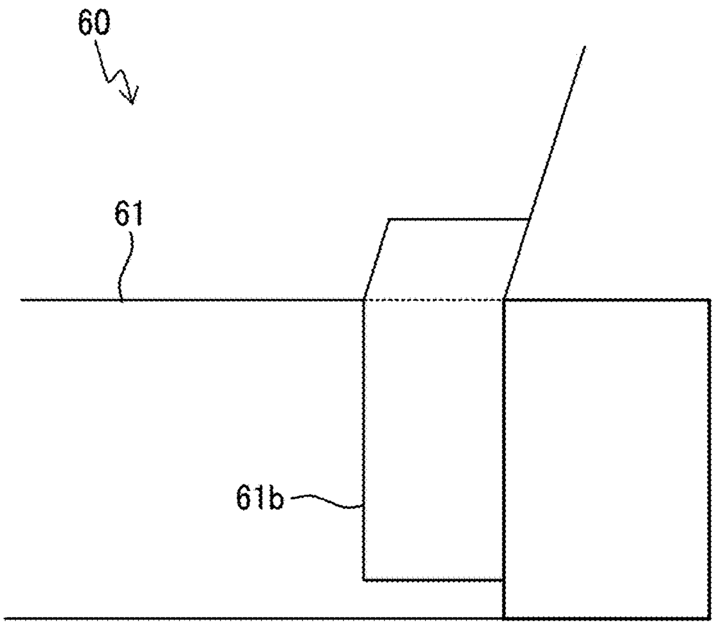
FIGS. 11A and 11B are diagrams illustrating the periphery of a cover disposed on a second housing.
Figure 11B:
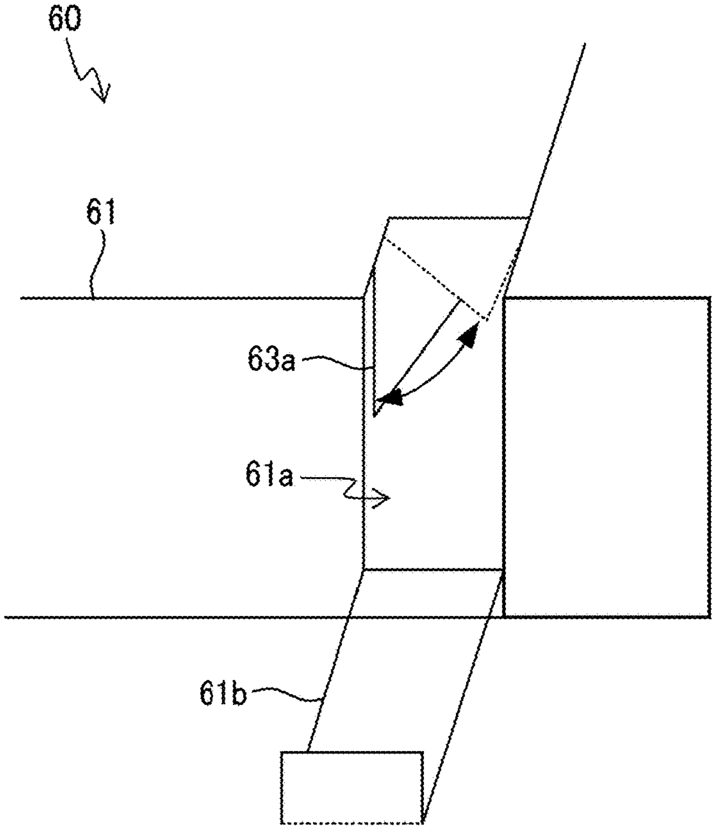

FIGS. 11A and 11B are diagrams illustrating the periphery of a cover 61*b* disposed on the second housing 61. As illustrated in FIG. 11B, an opening 61*a* is formed in a side wall of the second housing 61. The opening 61*a* penetrates the side wall of the second housing 61 at a position facing the pair of second guides 63*a* and 63*b*. The second housing 61 includes the cover 61*b* that can move (rotate in the present embodiment) to a closed position (FIG. 11A) and an open position (FIG. 11B). The cover 61*b* closes the opening 61*a* at the closed position, and opens the opening 61*a* at the open position.

Furthermore, one (the lower second guide 63*a* in the present embodiment) of the pair of second guides 63*a* and 63*b* is rotatable in a direction away from the other (the upper second guide 63*b* in the present embodiment) of the pair of second guides 63*a* and 63*b*, with a downstream end of the one of the pair of second guides 63*a* and 63*b* in the second conveyance direction serving as a rotation center. As a result, when the sheet S or the sheet bundle Sb is stuck (hereinafter, referred to as "jam") in the conveyance path Ph2 at the positions of the second guides 63*a* and 63*b*, the second guide 63*a* is rotated in a direction away from the second guide 63*b*, and the cover 61*b* is moved to the open position. Thus, the sheet S or sheet bundle Sb that has caused the jam can be removed.

As illustrated in FIGS. 8B and 9B, the first housing 51 of the first conveyance unit 50 is slidably supported by a guide rod 56 (slide mechanism) extending in the second conveyance direction in the in-body space 13. That is, the first conveyor 55 is slidable in the second conveyance direction along the guide rod 56. More specifically, the first conveyance unit 50 moves in a direction in which the first conveyance unit 50 comes into contact with the second conveyance unit 60 and in a direction in which the first conveyance unit 50 moves away from the second conveyance unit 60, without changing the relative positions of the components (51 to 55). The binding unit 30 may be movable along the guide rod 56 together with the first conveyance unit 50.

As illustrated in FIGS. 8A and 8B, when the first conveyance unit 50 slides in a direction away from the second conveyance unit 60, the conveyance path Ph2 (in other words, the distance between the first conveyor 55 and the second conveyor 65) is lengthened. As a result, the input interface of the binding unit 30 can be connected to the output interface of the image forming device 12 as illustrated in FIG. 1B. When the distance between the first conveyance unit 50 and the second conveyance unit 60 is maximized, the downstream end of the pair of first defining members 52*a* and 52*b* and the upstream end of the pair of second defining members 62*a* and 62*b* (more specifically, the pair of second guides 63*a* and 63*b*) in the second conveyance direction are separated from each other in the second conveyance direction.

Meanwhile, as illustrated in FIGS. 9A and 9B, when the first conveyance unit 50 slides in a direction in which the first conveyance unit 50 approaches the second conveyance unit 60, the conveyance path Ph2 (in other words, the distance between the first conveyor 55 and the second conveyor 65) is shortened. At this time, the first housing 51 enters the second housing 61, and the pair of first defining members 52*a* and 52*b* enters the space between the pair of second defining members 62*a* and 62*b*. As a result, a space that can accommodate one or both of the hole punching unit 70 and the folding unit 80 is formed between the output interface of the image forming device 12 and the input interface of the binding unit 30 as illustrated in FIG. 1C. Note that the first conveyance unit 50 may be manually slid by a user of the image forming apparatus 10, or may be slid by the driving force of a slide motor.

In the present embodiment, an example has been described in which the second conveyance unit 60 is fixed and the first conveyance unit 50 is slid in the second conveyance direction. As another example, the first conveyance unit 50 may be fixed, and the second conveyance unit 60 may be slid in the second conveyance direction. As still another example, both the first conveyance unit 50 and the second conveyance unit 60 may be slid in the second conveyance direction. That is, the first conveyance unit 50 and the second conveyance unit 60 (more specifically, the pair of first defining members 52*a* and 52*b* and the pair of second defining members 62*a* and 62*b*) just need to be configured such that the first conveyance unit 50 and the second conveyance unit 60 can move relative to each other in the second conveyance direction in such a way as to lengthen or shorten the conveyance path Ph2.

Figure 12B:
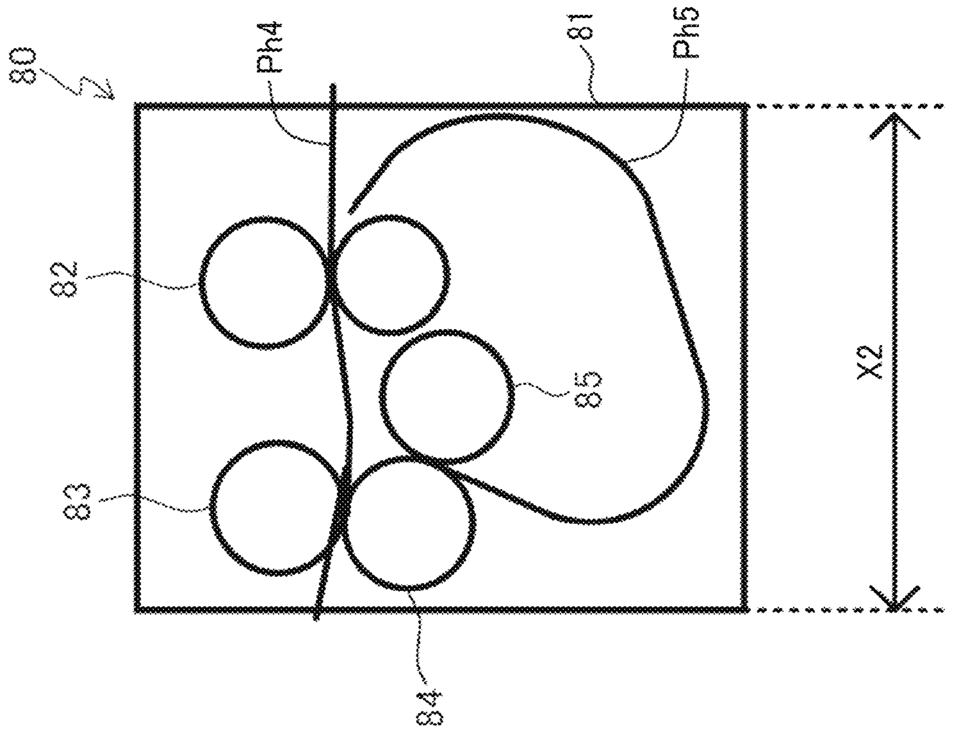
FIG. 12B is a schematic configuration diagram of a folding unit.
Figure 12A:
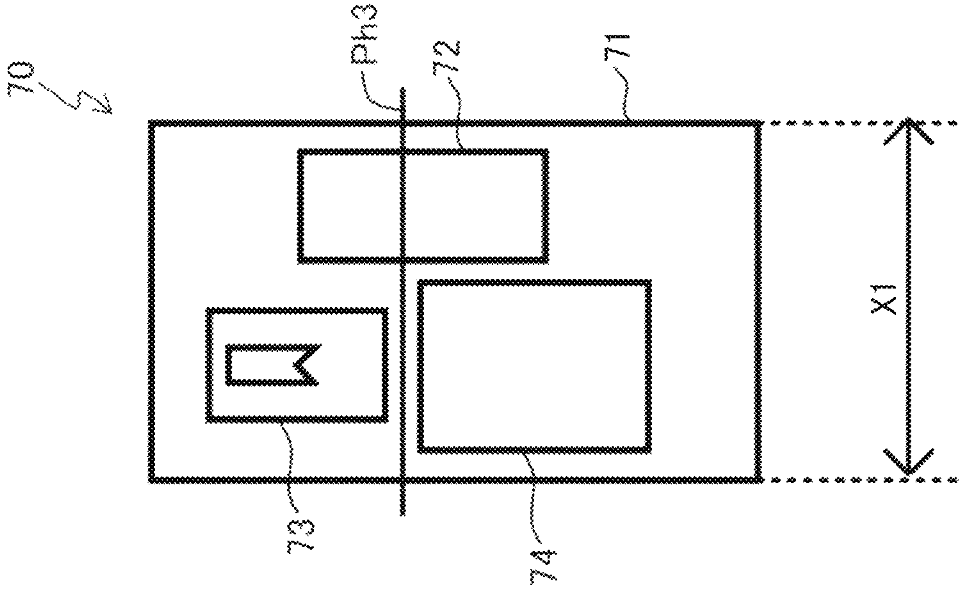
FIG. 12A is a schematic configuration diagram of a hole punching unit.

Next, configurations of the hole punching unit 70 and the folding unit 80 will be described with reference to FIGS. 12A and 12B. FIG. 12A is a schematic configuration diagram of the hole punching unit 70. FIG. 12B is a schematic configuration diagram of the folding unit 80. Since the configurations of the hole punching unit 70 and the folding unit 80 are already known, detailed description thereof is omitted, but for example, the following configurations are conceivable.

As illustrated in FIG. 12A, the hole punching unit 70 includes a housing 71, a sheet sensor 72, a punch pin 73, and a punch chad container 74. The housing 71 has a box shape to form an internal space for accommodating the components of the hole punching unit 70. A conveyance path Ph3 is formed in the internal space of the housing 71. The sheet S on which an image has been formed by the image forming device 12 passes through the conveyance path Ph3. The sheet sensor 72 detects that the sheet S supplied from the image forming device 12 has reached a predetermined position. The punch pin 73 punches a hole in the sheet S detected by the sheet sensor 72. Punch chads that have fallen off from the sheet S fall into the punch chad container 74. Thus, the hole punching unit 70 implements the punching process for punching a hole in the sheet S.

The folding unit 80 performs the folding process in which the sheet S on which an image has been formed by the image forming device 12 is folded into a predetermined shape (for example, Z fold, letter fold-out, or half fold). As illustrated in FIG. 12B, the folding unit 80 includes a housing 81, a conveyance roller pair 82, a first folding roller 83, a second folding roller 84, and a third folding roller 85.

The housing 81 has a box shape to form an internal space for accommodating the components of the folding unit 80. A main conveyance path Ph4 and a return conveyance path Ph5 are formed in the internal space of the housing 81. The main conveyance path Ph4 and the return conveyance path Ph5 are spaces through which the sheet S passes. The conveyance roller pair 82 conveys the sheet S along the main conveyance path Ph4. The first folding roller 83 is rotatably supported by the housing 81 at a position facing the main conveyance path Ph4. The second folding roller 84 is rotatably supported by the housing 81 at a position facing both the main conveyance path Ph4 and the return conveyance path Ph5. The third folding roller 85 is rotatably supported by the housing 81 at a position facing the return conveyance path Ph5.

The folding unit 80 rotates the conveyance roller pair 82, the first folding roller 83, and the second folding roller 84 in the forward direction. Next, the folding unit 80 rotates the conveyance roller pair 82 in the forward direction, and rotates the first folding roller 83, the second folding roller 84, and the third folding roller 85 in the reverse direction. As a result, the sheet S enters the return conveyance path Ph5 with a folding position at the head, and is nipped by the second folding roller 84 and the third folding roller 85. As a result, the sheet S is folded at the folding position. Next, the folding unit 80 rotates the conveyance roller pair 82, the first folding roller 83, and the second folding roller 84 in the forward direction at a timing when the rear end of the sheet S passes through the nipping position of the second folding roller 84 and the third folding roller 85. As a result, the sheet S is ejected from the folding unit 80 with the folding position at the head.

Figure 13:
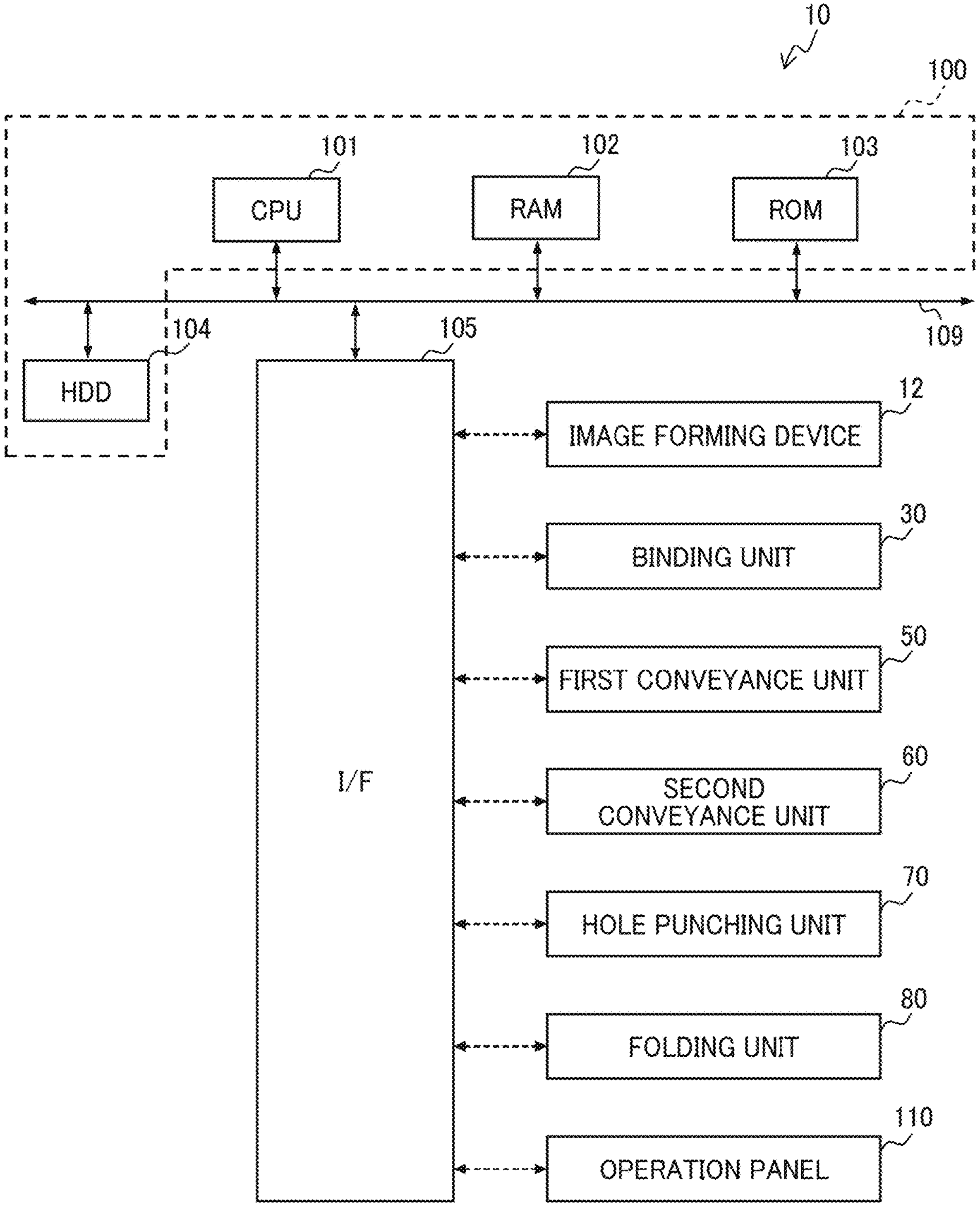
FIG. 13 is a block diagram illustrating a hardware configuration of the image forming apparatus.

FIG. 13 is a block diagram illustrating a hardware configuration of the image forming apparatus 10. As illustrated in FIG. 13, the image forming apparatus 10 has a configuration in which a central processing unit (CPU) 101, a random access memory (RAM) 102, a read only memory (ROM) 103, a hard disk drive (HDD) 104, and an interface (I/F) 105 are connected via a common bus 109.

The CPU 101 is an arithmetic unit, and controls the overall operation of the image forming apparatus 10. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the image forming apparatus 10 processes, for example, a control program stored in the ROM 103 and an information processing program (application program) loaded into the RAM 102 from a storage medium such as the HDD 104. Such processing configures a software controller including various functional modules of the image forming apparatus 10. The software controller thus configured cooperates with hardware resources of the image forming apparatus 10 to construct functional blocks that implement functions of the image forming apparatus 10. That is, the CPU 101, the RAM 102, the ROM 103, and the HDD 104 form the controller 100 that controls operation of the image forming apparatus 10.

The I/F 105 is an interface that connects the image forming device 12, the binding unit 30, the first conveyance unit 50, the second conveyance unit 60, the hole punching unit 70, the folding unit 80, and an operation panel 110 to the common bus 109. The controller 100 causes, through the I/F 105, the image forming device 12, the binding unit 30, the first conveyance unit 50, the second conveyance unit 60, the hole punching unit 70, the folding unit 80, and the operation panel 110 to operate.

The operation panel 110 includes an operation device that receives instructions from a user and a display serving as a notifier that notifies the user of information. The operation device includes, for example, physical input buttons and a touch panel overlaid on a display. The operation panel 110 acquires information from an operator through the operation device, and provides the operator with information through the display. A specific example of the notifier is not limited to the display, and may be a light emitting diode (LED) lamp or a speaker.

The controller 100 controls conveyance of the sheet S or the sheet bundle Sb based on detection signals output from the sheet sensors 54 and 64 and rotary encoders of the drive motors 55*c* and 65*c*. First, the controller 100 causes the drive motor 55*c* to rotate, in response to the start of output of a detection signal from the sheet sensor 54. As a result, the sheet S or the sheet bundle Sb supplied from the binding unit 30 is nipped by the first conveyor 55, conveyed in the second conveyance direction, and supplied to the second conveyance unit 60. In addition, the controller 100 causes the drive motor 65*c* to rotate, in response to the start of output of a detection signal from the sheet sensor 64. As a result, the sheet S or the sheet bundle Sb is nipped by the second conveyors 65 and 66, conveyed in the second conveyance direction, and ejected to the output tray 67.

In addition, the controller 100 starts to count pulse signals output from the rotary encoder of the drive motor 55*c*, in response to the start of output of a detection signal from the sheet sensor 54. In a case where the output of the detection signal from the sheet sensor 54 is not stopped even if the number of counted pulse signals reaches a predetermined value (that is, even if the first conveyor 55 is driven by a predetermined amount), the controller 100 determines that the sheet S or the sheet bundle Sb is stuck between the pair of first defining members 52*a* and 52*b*, and provides notification of occurrence of the jam through the operation panel 110.

Similarly, the controller 100 starts to count pulse signals output from the rotary encoder of the drive motor 65*c*, in response to the start of output of a detection signal from the sheet sensor 64. In a case where the output of the detection signal from the sheet sensor 64 is not stopped even if the number of counted pulse signals reaches a predetermined value (that is, even if the second conveyor 65 is driven by a predetermined amount), the controller 100 determines that the sheet S or the sheet bundle Sb is stuck between the pair of second defining members 62*a* and 62*b*, and provides notification of occurrence of the jam through the operation panel 110.

Figure 15A:
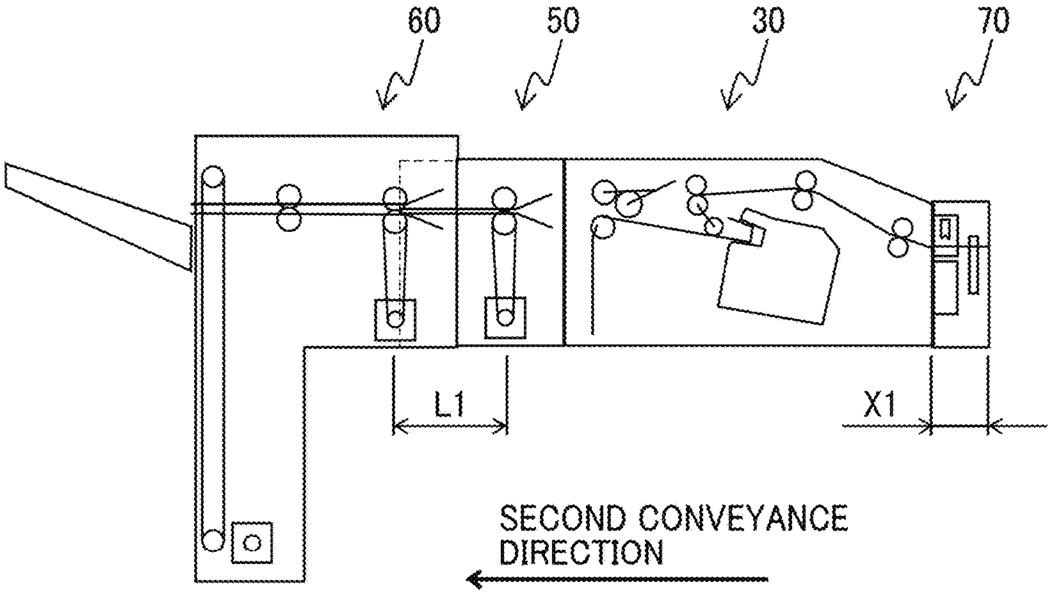
FIGS. 15A and 15B are diagrams each illustrating a relationship between the type of optional device and the distance between the first conveyor and the second conveyor.
Figure 15B:
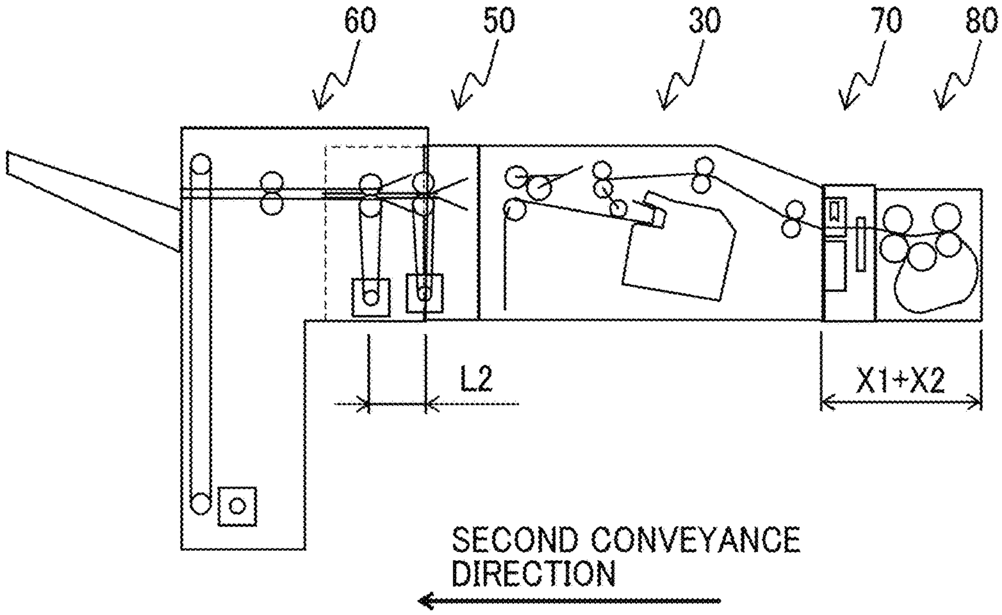

Next, a description will be given of conveyance control to be performed by the controller 100 according to the type of optional device installed in the in-body space 13. FIG. 14 is an example of data contained in an option table. FIGS. 15A and 15B are diagrams each illustrating a relationship between the type of optional device installed in the in-body space 13 and the distance between the first conveyor 55 and the second conveyor 65.

The HDD 104 stores the option table illustrated in FIG. 14. The option table shows relationships between optional devices installed in the in-body space 13 and the states of a first installation signal and a second installation signal and distance information. The first installation signal is in a high (H) state when the hole punching unit 70 is installed, and is in a low (L) state when the hole punching unit 70 is not installed. The second installation signal is in a high (H) state when the folding unit 80 is installed, and is in a low (L) state when the folding unit 80 is not installed. The distance information refers to a distance between the output interface of the image forming device 12 and the input interface of the binding unit 30 (length in the second conveyance direction) necessary for installation of an optional device in the in-body space 13.

As an example, in a case where only the hole punching unit 70 is installed as an optional device, as illustrated in FIG. 15A, the first installation signal is in the H state, and the second installation signal is in the L state. At this time, it is necessary to shorten the conveyance path Ph2 by a length X1 so as to install the optional device. When the conveyance path Ph2 is shortened by the length X1, the distance between the first conveyor 55 and the second conveyor 65 in the second conveyance direction is denoted by L1. Therefore, the controller 100 may start to drive the drive motor 55*c* in response to the number of pulse signals output from the rotary encoder of the drive motor 65*c* reaching a first predetermined number (a number corresponding to the conveyance distance L1) after the start of output of a detection signal from the sheet sensor 54.

As another example, in a case where both the hole punching unit 70 and the folding unit 80 are installed as optional devices, as illustrated in FIG. 15B, the first installation signal and the second installation signal are in the H state. At this time, it is necessary to shorten the conveyance path Ph2 by a length "X1+X2" so as to install the optional devices. When the conveyance path Ph2 is shortened by the length "X1+X2", the distance between the first conveyor 55 and the second conveyor 65 in the second conveyance direction is denoted by L2 (<L1). Therefore, the controller 100 may start to drive the drive motor 55*c* in response to the number of pulse signals output from the rotary encoder of the drive motor 65*c* reaching a second predetermined number (a number corresponding to the conveyance distance L2) after the start of output of a detection signal from the sheet sensor 54.

As described above, the controller 100 may control the drive timings of the first conveyor 55 and the second conveyor 65 according to the length of the conveyance path Ph2 between the first conveyor 55 and the second conveyor 65. In this case, the sheet sensor 64 may be omitted.

According to the above embodiment of the present disclosure, for example, the following operational effects can be obtained.

According to the above embodiment, the length of the conveyance path Ph2 can be adjusted according to the size of an optional device installed in the in-body space 13. Thus, the degree of freedom can be improved in terms of installation space in the media conveying apparatus (50, 60) including the output tray 67 on which a large number of sheets S or sheet bundles Sb can be put.

According to the above embodiment, since the second guides 63*a* and 63*b* are disposed at the ends of the second defining members 62*a* and 62*b*, it is possible to prevent the sheet S or the sheet bundle Sb passing through the conveyance path Ph2 from being stuck in the conveyance path Ph2 between the first defining members 52*a* and 52*b* and the second defining members 62*a* and 62*b*.

According to the above embodiment, since the cover 61*b* is disposed in such a way as to face the second guides 63*a* and 63*b*, where a jam is most likely to occur in the media conveying apparatus (50, 60), the workability of jam handling is improved. The opening and the cover may be disposed at positions facing the first guides 53*a* and 53*b* of the first housing 51.

According to the above embodiment, the second guide 63*a* is rotatable in a direction away from the second guide 63*b*, so that the workability of jam handling is further improved. Instead of making the second guide 63*a* rotatable, the second guide 63*a* may be made of a highly flexible material such as Mylar®.

According to the above embodiment, occurrence of a jam is detected by the sheet sensor 64, and notification thereof is provided through the operation panel 110. As a result, the downtime of the image forming apparatus 10 can be shortened.

Furthermore, according to the above embodiment, since the distance between the driving roller 55*a* and the driven roller 55*b* is adjusted by the pressing mechanism 55*f*, it is possible to handle the sheets S or the sheet bundles Sb having various thicknesses.

According to the above embodiment, the first conveyance unit 50 and the second conveyance unit 60 are unitized, and the entire first conveyance unit 50 is slid in the second conveyance direction. Thus, the configuration can be simplified as compared with a case where the components (51 to 55) of the first conveyance unit 50 are separately slid. In addition, since the relative positions of the components (51 to 55) do not change, deterioration in conveyance accuracy can be prevented.

Furthermore, it is possible to obtain the image forming apparatus 10 in which various optional devices can be installed, by installing the media conveying apparatus (50, 60) of the above embodiment in the in-body space 13. In addition, since it is not necessary to replace the media conveying apparatus (50, 60) in accordance with the size of an optional device, the downtime of the image forming apparatus 10 can be minimized.

Furthermore, according to the above embodiment, since the drive timings of the first conveyor 55 and the second conveyor 65 are controlled in accordance with the length of the conveyance path Ph2 to be lengthened or shortened, it is possible to reduce the number of sensors that detect the sheet S or the sheet bundle Sb. This also contributes to energy saving.

The present disclosure is not limited to the specific embodiment described above, and numerous additional modifications and variations are possible in light of the teachings within the technical scope of the present disclosure. It is therefore to be understood that the above-described embodiment of the present disclosure may be practiced otherwise by those skilled in the art than as specifically described herein. Such modifications and variations are included in the technical scope described in the appended claims.

Aspects of the present disclosure are, for example, as follows.

First Aspect

According to a first aspect, a media conveying apparatus includes: a pair of first defining members that defines an upstream part of a conveyance path in a conveyance direction; a pair of second defining members that defines a downstream part of the conveyance path in the conveyance direction; a first conveyor that conveys a medium in the conveyance path defined by the pair of first defining members in the conveyance direction; a second conveyor that conveys the medium in the conveyance path defined by the pair of second defining members in the conveyance direction; a tray disposed downstream from the pair of second defining members in the conveyance direction, the tray to stack the medium ejected from the conveyance path; and a lift that raises and lowers the tray. The pair of first defining members and the pair of second defining members are movable relative to each other in the conveyance direction in such a way as to lengthen or shorten the conveyance path.

Second Aspect

According to a second aspect, in the media conveying apparatus of the first aspect, a pair of guides is disposed at an upstream end of the pair of second defining members in the conveyance direction, a distance between the pair of guides increasing toward an upstream side in the conveyance direction.

Third Aspect

According to a third aspect, the media conveying apparatus of the second aspect, further includes: a housing that houses the pair of second defining members and the second conveyor; and a cover that can move to a closed position to close an opening and an open position to open the opening, the housing having the opening at a position to face the pair of guides.

Fourth Aspect

According to a fourth aspect, in the media conveying apparatus of the third aspect, one of the pair of guides is rotatable in a direction away from another of the pair of guides, a downstream end of the one of the pair of guides in the conveyance direction serving as a rotation center.

Fifth Aspect

According to a fifth aspect, the media conveying apparatus of the third aspect or the fourth aspect, further includes: a sensor that outputs a detection signal when the medium is located between the pair of guides; and a notifier that notifies that the medium is stuck in the conveyance path in a case where output of the detection signal from the sensor is not stopped even when the second conveyor is driven by a predetermined amount after the output of the detection signal is started.

Sixth Aspect

According to a sixth aspect, in the media conveying apparatus of any one of the first aspect to the fifth aspect, each of the first conveyor and the second conveyor includes: a drive roller; a driven roller disposed in such a way as to face the drive roller across the conveyance path, the driven roller being to be brought into contact with and separated from the drive roller; a drive motor that generates driving force for rotating the drive roller; and a pressing mechanism that presses the driven roller against the drive roller.

Seventh Aspect

According to a seventh aspect, the media conveying apparatus of any one of the first aspect to the sixth aspect, further includes: a first conveyance unit including a first housing that houses the pair of first defining members and the first conveyor; and a second conveyance unit including a second housing that houses the pair of second defining members, the second conveyor, and the lift, the second housing supporting the tray with an outer wall. The conveyance path is shortened as the first housing enters the second housing.

Eighth Aspect

According to an eighth aspect, an image forming apparatus includes: an image forming device that forms an image on a medium; a housing that houses the image forming device and has an in-body space; and the media conveying apparatus of any one of the first aspect to the seventh aspect, the media conveying apparatus being detachably installed in the in-body space. The tray moves up and down along an outer wall of the housing.

Ninth Aspect

According to a ninth aspect, the image forming apparatus of the eighth aspect, further includes a post-processing device that is detachably installed in the in-body space, and performs post processing on the medium on which an image has been formed by the image forming device. The media conveying apparatus is detachably connected to the post-processing device, and conveys the medium subjected to the post processing toward the tray.

Tenth Aspect

According to a tenth aspect, in the image forming apparatus of the ninth aspect, the pair of first defining members and the pair of second defining members lengthen or shorten the conveyance path in accordance with a size of an optional device located between and connected to the image forming device and the post-processing device in the in-body space.

Eleventh Aspect

According to an eleventh aspect, the image forming apparatus of the tenth aspect, further includes a controller that controls drive timings of the first conveyor and the second conveyor according to a length of the conveyance path between the first conveyor and the second conveyor.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A media conveying apparatus, comprising:
- a pair of first defining members defining an upstream part of a conveyance path in a conveyance direction;
- a pair of second defining members defining a downstream part of the conveyance path in the conveyance direction;
- a first conveyor configured to convey a medium in the upstream part defined by the pair of first defining members in the conveyance direction;
- a second conveyor configured to convey the medium in the downstream part defined by the pair of second defining members in the conveyance direction;
- a tray disposed downstream from the pair of second defining members in the conveyance direction, the tray configured to stack the medium ejected from the conveyance path;
- a first conveyance unit including a first housing that houses the pair of first defining members and the first conveyor; and
- a second conveyance unit including a second housing that houses the pair of second defining members and the second conveyor, the second housing having an outer wall that supports the tray,
- wherein the pair of first defining members and the pair of second defining members are movable relative to each other in the conveyance direction to lengthen and shorten the conveyance path including the upstream part and the downstream part, and
- wherein the conveyance path is shortened as the first housing enters the second housing.

2. The media conveying apparatus according to claim 1, further comprising a pair of guides disposed at an upstream end of the pair of second defining members in the conveyance direction,
- wherein a distance between the pair of guides increases toward an upstream side in the conveyance direction.

3. The media conveying apparatus according to claim 2, further comprising:
- a cover configured to move to a closed position to close an opening and an open position to open the opening, the second housing having the opening at a position to face the pair of guides.

4. The media conveying apparatus according to claim 3,
- wherein one of the pair of guides is rotatable in a direction away from another of the pair of guides, with a downstream end of the one of the pair of guides in the conveyance direction serving as a rotation center.

5. The media conveying apparatus according to claim 3, further comprising:
- a sensor configured to output a detection signal when the medium is located between the pair of guides; and
- a notifier configured to notify that the medium is stuck in the conveyance path in a case where output of the detection signal from the sensor is not stopped even when the second conveyor is driven by a predetermined amount after the output of the detection signal is started.

6. The media conveying apparatus according to claim 1,
- wherein each of the first conveyor and the second conveyor includes:
  - a drive roller;
  - a driven roller facing the drive roller across the conveyance path, the driven roller being to be brought into contact with and separated from the drive roller;
  - a drive motor configured to generate driving force for rotating the drive roller; and
  - a pressing mechanism configured to press the driven roller against the drive roller.

7. The media conveying apparatus according to claim 1, further comprising a lift configured to raise and lower the tray.

8. An image forming apparatus comprising:
- an image forming device configured to form an image on a medium;
- a housing that houses the image forming device and has an in-body space; and the media conveying apparatus according to claim 1, the media conveying apparatus detachably installed in the in-body space, wherein the tray moves up and down along an outer wall of the housing.

9. The image forming apparatus according to claim 8, further comprising a post-processing device detachably installed in the in-body space, the post-processing device being configured to perform post processing on the medium on which an image has been formed by the image forming device, wherein the media conveying apparatus is detachably connected to the post-processing device, and conveys the medium subjected to the post processing toward the tray.

10. The image forming apparatus according to claim 9, wherein the pair of first defining members and the pair of second defining members lengthen and shorten the conveyance path including the upstream part and the downstream part, in accordance with a size of an optional device located between and connected to the image forming device and the post-processing device in the in-body space.

11. The image forming apparatus according to claim 10, further comprising a controller configured to control drive timings of the first conveyor and the second conveyor according to a length of the conveyance path between the first conveyor and the second conveyor.

12. A media conveying apparatus, comprising:

a conveyance path including a first conveyance path, and a second conveyance path downstream from the first conveyance path in a conveyance direction;

a first conveyor configured to convey a medium in the first conveyance path in the conveyance direction;

a second conveyor configured to convey the medium in the second conveyance path in the conveyance direction;

a tray disposed downstream from the second conveyance path in the conveyance direction, the tray configured to stack the medium ejected from the second conveyance path;

a first conveyance unit including a first housing that houses the pair of first defining members and the first conveyor; and a second conveyance unit including a second housing that houses the pair of second defining members and the second conveyor, the second housing having an outer wall that supports the tray, wherein the first conveyor and the second conveyor are movable relative to each other in the conveyance direction to lengthen and shorten the conveyance path, and wherein the conveyance path is shortened as the first housing enters the second housing.

* * * * *